(12) United States Patent
Kondo et al.

(10) Patent No.: US 7,369,705 B2
(45) Date of Patent: May 6, 2008

(54) IMAGE DATA COMPRESSION DEVICE AND ENCODER

(75) Inventors: Yoshimasa Kondo, Matsumoto (JP); Kyoichi Osada, Kofu (JP)

(73) Assignee: Seiko Epson Corporation, Tokyo (JP)

( * ) Notice: Subject to any disclaimer, the term of this patent is extended or adjusted under 35 U.S.C. 154(b) by 735 days.

(21) Appl. No.: 10/981,690

(22) Filed: Nov. 5, 2004

(65) Prior Publication Data

US 2005/0123050 A1    Jun. 9, 2005

(30) Foreign Application Priority Data

Nov. 20, 2003   (JP)   ............... 2003-391089

(51) Int. Cl.
   *G06K 9/36*   (2006.01)
(52) U.S. Cl. ...................... 382/232; 382/251
(58) Field of Classification Search ................ 382/232, 382/251, 248, 250, 235, 245; 375/240.03, 375/240.16, 240.2, 240.21, 240.12, 240.18, 375/E7.134
See application file for complete search history.

(56) References Cited

FOREIGN PATENT DOCUMENTS

| JP | A 06-268997 | 9/1994 |
| JP | A 07-023385 | 1/1995 |
| JP | A 11-122623 | 4/1999 |
| JP | A 2001-8215 | 1/2001 |
| JP | A 2001-025016 | 1/2001 |

OTHER PUBLICATIONS

Ronda et al., "Rate Control and Bit Allocation for MPEG-4", IEEE, vol. 9., No. 8, Dec. 1999, pp. 1243-1258.*
U.S. Appl. No. 10/847,612, filed May 18, 2004, Kondo et al.
U.S. Appl. No. 10/847,613, filed May 18, 2004, Kondo et al.
U.S. Appl. No. 10/851,334, filed May 24, 2004, Kondo et al.
U.S. Appl. No. 10/981,633, filed Nov. 5, 2004, Kondo et al.
U.S. Appl. No. 10/981,725, filed Nov. 5, 2004, Kondo et al.
U.S. Appl. No. 10/981,674, filed Nov. 5, 2004, Kondo et al.
"Recommendation ISO/TEC 14496-2: 1999 (E) Annex L," pp. 311-321, 1999.
Tsuneo, Okubo et al., "A Hardware/Software Co-design for Real-time MPEG2 LSIs," NTT R&D, vol. 46, No. 6, pp. 609-614, Jun. 10, 1999.

* cited by examiner

*Primary Examiner*—Anh Hong Do
(74) *Attorney, Agent, or Firm*—Oliff & Berridge, PLC

(57) ABSTRACT

An image data compression device includes: a quantization section which quantizes image data based on a quantization parameter; a FIFO buffer section in which quantized data for at least N frames (N is an integer larger than one) is buffered; an encoded data generation section which reads the quantized data from the FIFO buffer section, and generates encoded data; a rate control section which changes a quantization step by using a data size of the encoded data; and a frame skip section which skips a quantization processing of the quantization section. The rate control section calculates the quantization parameter by using an average data size of the encoded data for previous N frames, and the frame skip section performs the skip processing when a frame in which the quantization parameter is greater than a threshold continues equal to or more than a number of times for a number threshold.

26 Claims, 28 Drawing Sheets

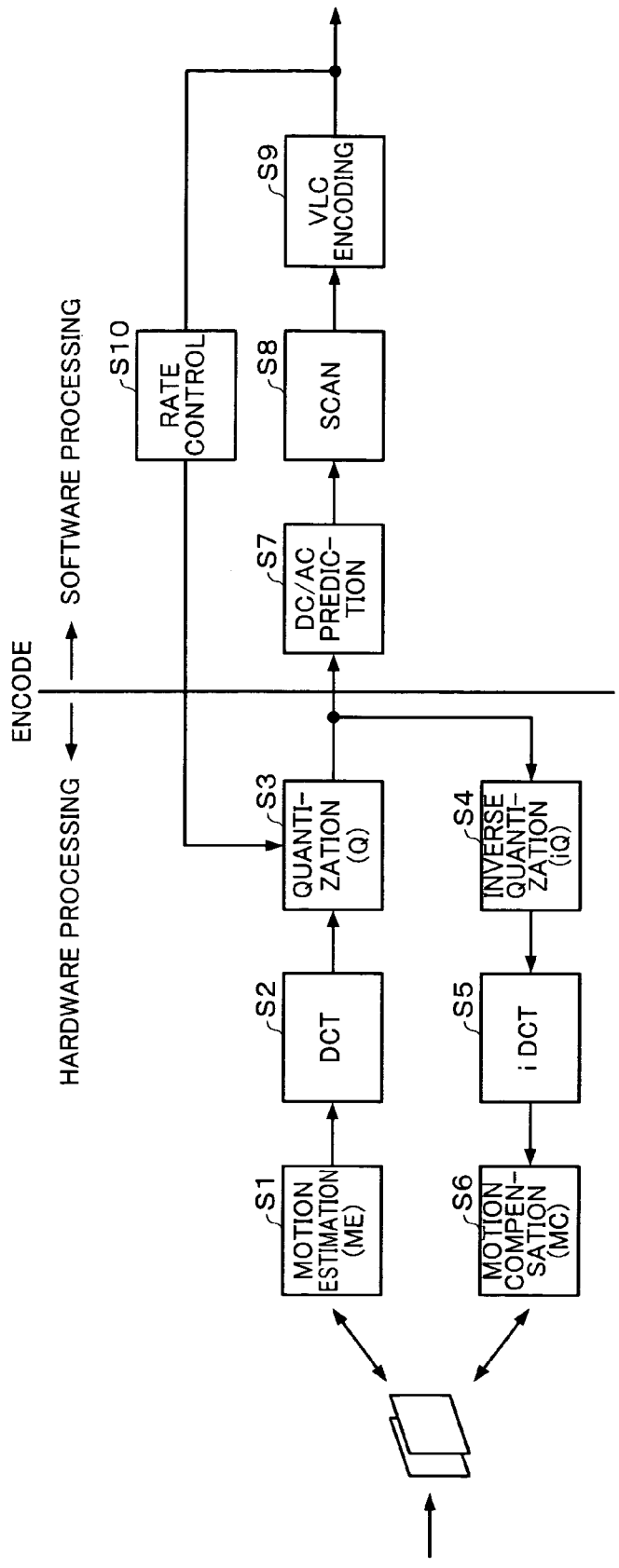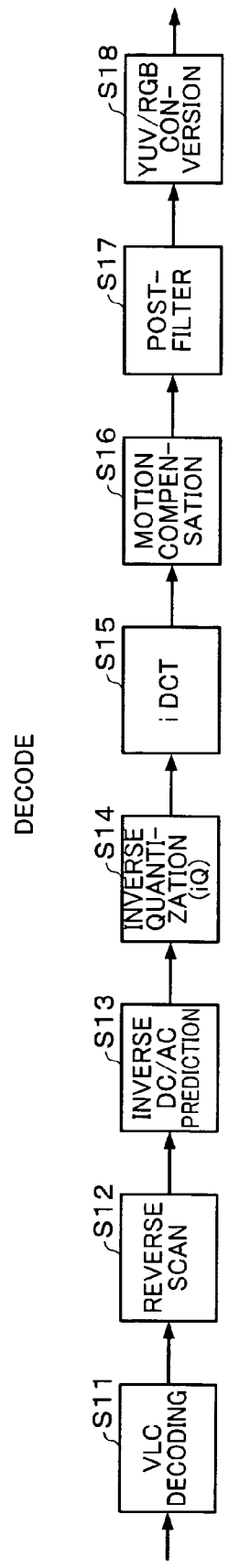

FIG. 3

DCT COEFFICIENT

HIGHER FREQUENCY →

HIGHER FREQUENCY ↓

| 224 | 130 | 40 | 16 | 11 | 8 | -2 | -1 |
|-----|-----|-----|-----|-----|-----|-----|-----|
| 41 | -34 | -14 | -10 | -4 | 0 | -1 | 3 |
| -7 | 10 | -12 | 2 | 2 | -5 | 1 | -1 |
| 22 | -7 | 9 | 2 | 0 | 0 | -3 | 2 |
| -8 | 4 | -6 | 3 | -1 | -2 | 4 | -1 |
| 5 | 2 | -1 | -4 | 0 | 1 | -1 | -1 |
| 4 | -5 | 3 | -1 | 0 | 2 | 0 | -1 |
| -5 | 5 | -2 | 3 | 0 | -2 | 1 | -1 |

FIG. 4

QUANTIZATION TABLE

| 8 | 6 | 5 | 8 | 12 | 20 | 26 | 30 |
|---|---|---|---|----|----|----|----|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

FIG. 5

QUANTIZED DCT COEFFICIENT

| 28 | 22 | 8  | 2  | 1 | 0 | 0 | 0 |
|----|----|----|----|---|---|---|---|
| 7  | -6 | -2 | -1 | 0 | 0 | 0 | 0 |
| -1 | 1  | -2 | 0  | 0 | 0 | 0 | 0 |
| 3  | -1 | 1  | 0  | 0 | 0 | 0 | 0 |
| -1 | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |

FIG. 6

$$R = X_1 Ec \frac{1}{Qc} + X_2 Ec \frac{1}{Qc^2}$$

$$Ec = \begin{cases} \sum \frac{|x'_{ij}|}{A} & \text{(INTER-FRAME-CODED MACROBLOCK)} \\ \sum \frac{|x_{ij} - \mu|}{A} & \text{(INTRA-FRAME-CODED MACROBLOCK)} \end{cases}$$

$$(\mu = \sum \frac{|x_{ij}|}{A})$$

FIG. 14

| VARIABLE | DEFINITION |
|---|---|
| Rs | BIT RATE |
| Rc | NUMBER OF BITS USED TO ENCODE CURRENT FRAME |
| Rp | AVERAGE NUMBER OF BITS GENERATED PER FRAME |
| Ec | AVERAGE ABSOLUTE VALUE OF DATA IN CURRENT FRAME |
| Qc | QUANTIZATION PARAMETER IN CURRENT FRAME |
| Qp | QUANTIZATION PARAMETER IN PREVIOUS FRAME |
| Nr | NUMBER OF REMAINING ENCODE FRAME |
| Rr | NUMBER OF AVAILABLE BITS |
| T | NUMBER OF BITS ASSIGNED TO CURRENT FRAME |
| S | NUMBER OF BITS USED IN PREVIOUS FRAME |
| Hp | NUMBER OF BITS IN PREVIOUS FRAME EXCLUDING INFORMATION SUCH AS HEADER AND MOTION VECTOR |
| Bs | NUMBER OF BITS OF FIFO BUFFER SECTION |
| B | NUMBER OF CURRENTLY OCCUPIED BITS IN FIFO BUFFER SECTION |

IMAGE DATA COMPRESSION DEVICE AND ENCODER

Japanese Patent Application No. 2003-391089, filed on Nov. 20, 2003, is hereby incorporated by reference in its entirety.

BACKGROUND OF THE INVENTION

The present invention relates to an image data compression device and an encoder.

Moving Picture Experts Group Phase 4 (MPEG-4) has been standardized as a general-purpose coding method for multimedia information such as image data of a still image or a moving image and sound data. A recent portable instrument realizes encoding and decoding of image data conforming to the MPEG-4 standard, and can perform moving image reproduction and transmission/reception through a network.

In the MPEG-4 standard, compressed data obtained by encoding image data of a moving image must be generated at a constant rate. However, when compressing image data of a moving image, the compression efficiency changes to a large extent depending on the type of image data. MPEG-4 Visual Part (Recommendation ISO/IEC 14496-2: 1999 (E) Annex L) describes a rate control method for generating compressed data at a constant rate by controlling the amount of code to be generated so that such a change is limited within a predetermined range.

When performing MPEG-4 encode (compression) processing, a series of processing may be entirely performed by hardware. However, since this results in an increase in the circuit scale, it is difficult to achieve a reduction of size when integrating circuits in an IC (semiconductor device or integrated circuit). In particular, a portable instrument such as a portable telephone cannot satisfy a demand for a reduction of the size of the instrument.

A series of encode processing may be entirely performed by using software. However, this increases the load imposed on a central processing unit (CPU) which processes the software. Therefore, the time necessary for the CPU to perform another processing is limited, whereby the performance of an instrument provided with the CPU is decreased. Moreover, since the processing time of the CPU is increased, power consumption is increased. In particular, a portable instrument such as a portable telephone cannot satisfy a demand for a reduction of power consumption in order to maintain battery life.

Therefore, a series of encode processing may be allocated between hardware and software. However, as a result of studies conducted by the present inventors, it was found that the rate control method disclosed in MPEG-4 Visual Part (Recommendation ISO/IEC 14496-2: 1999 (E) Annex L) cannot be performed when optimizing the allocation of a series of encode processing between hardware and software. Therefore, optimization of allocation of image data compression processing between hardware and software and generation of compressed data at a constant rate cannot be achieved in combination.

According to the rate control method described in MPEG-4 Visual Part (Recommendation ISO/IEC 14496-2: 1999 (E) Annex L), even if the generation rate of compressed data can be controlled, block noise is generally displayed in the image generated by decompressing the compressed data, whereby the display quality may deteriorate.

On the other hand, the amount of compressed data is increased in order to prevent deterioration of the display quality, whereby a desired rate may not be maintained.

BRIEF SUMMARY OF THE INVENTION

A first aspect of the present invention relates to an image data compression device for compressing image data, the image data compression device comprising:

an image data processing section which includes a quantization section which quantizes image data by a quantization step which changes based on a quantization parameter;

a FIFO buffer section in which quantized data for at least N frames (N is an integer larger than one) quantized by the quantization section is buffered;

an encoded data generation section which reads the quantized data from the FIFO buffer section asynchronously from writing into the FIFO buffer section, and generates encoded data by encoding the quantized data;

a rate control section which calculates the quantization parameter by using a data size of the encoded data, and controls a data size of encoded data to be processed by changing the quantization step of the quantization section; and a frame skip section which performs skip processing of causing the image data processing section to skip processing of image data in a frame processed by the image data processing section or image data in a frame subsequent to the processed frame, wherein the rate control section calculates the quantization parameter by using an average data size obtained by averaging the data size of the encoded data for N frames before a frame of the image data quantized by the quantization section, and wherein the frame skip section performs the skip processing when a frame in which the quantization parameter calculated for each frame is greater than a skip threshold continues a number of times equal to or greater than a number of times set as a skip continuous number threshold.

A second aspect of the present invention relates to an image data compression device for compressing image data, the image data compression device comprising:

an image data processing section which includes a quantization section which quantizes image data by a quantization step which changes based on a quantization parameter;

a FIFO buffer section in which quantized data for at least N frames (N is an integer larger than one) quantized by the quantization section is buffered;

an encoded data generation section which reads the quantized data from the FIFO buffer section asynchronously from writing into the FIFO buffer section, and generates encoded data by encoding the quantized data;

a rate control section which calculates the quantization parameter by using a data size of the encoded data, and controls a data size of encoded data to be processed by changing the quantization step of the quantization section; and a frame skip section which performs skip processing of causing the image data processing section to skip processing of image data in a frame processed by the image data processing section or image data in a frame subsequent to the processed frame, wherein the rate control section calculates the quantization parameter by using an average data size obtained by averaging the data size of the encoded data for N frames before a frame of the image data quantized by the quantization section, and wherein the frame skip section performs the skip processing when complexity corresponding to a difference between image data quantized by the quantization section and image data in a frame before a frame of the quantized image data is equal to or greater than a complexity threshold.

A third aspect of the present invention relates to an encoder which performs compression processing of image data, the encoder comprising:

an image input interface which performs interface processing for inputting image data;

an image data processing section which includes a quantization section which quantizes the image data by a quantization step which changes based on a quantization parameter;

a FIFO buffer section in which quantized data for at least N frames (N is an integer larger than one) quantized by the quantization section is buffered;

a host interface which performs interface processing with a host which reads quantized data stored in the FIFO buffer section asynchronously from writing into the FIFO buffer section; and a software start flag register for allowing the host to start the compression processing, wherein the host calculates the quantization parameter by using an average data size obtained by averaging a data size of encoded data for N frames before a frame of the image data quantized by the quantization section, and sets the software start flag register on condition that a frame in which the quantization parameter is greater than a skip threshold does not continue a number of times equal to or greater than a number of times set as a skip continuous number threshold, and wherein the image data processing section starts the compression processing when the software start flag register has been set.

A fourth aspect of the present invention relates to an encoder which performs compression processing of image data, the encoder comprising:

an image input interface which performs interface processing for inputting image data;

an image data processing section which includes a quantization section which quantizes the image data by a quantization step which changes based on a quantization parameter;

a FIFO buffer section in which quantized data for at least N frames (N is an integer larger than one) quantized by the quantization section is buffered;

a host interface which performs interface processing with a host which reads quantized data stored in the FIFO buffer section asynchronously from writing into the FIFO buffer section; and a software start flag register for allowing the host to start the compression processing, wherein the host calculates the quantization parameter by using an average data size obtained by averaging a data size of encoded data for N frames before a frame of the image data quantized by the quantization section, and sets the software start flag register on condition that difference information between image data quantized by the quantization section and image data in a frame before a frame of the quantized image data is less than a complexity threshold, and wherein the image data processing section starts the compression processing when the software start flag register has been set.

BRIEF DESCRIPTION OF THE SEVERAL VIEWS OF THE DRAWING

FIGS. 1A and 1B are block diagrams of MPEG-4 encode processing and decode processing.

FIG. 3 is illustrative of an example of DCT coefficients.

FIG. 4 is illustrative of an example of a quantization table.

FIG. 5 is illustrative of an example of quantized DCT coefficients.

FIG. 6 is illustrative of a model equation used in a rate control method.

FIG. 14 is a table illustrating variables used in calculation processing of a quantization parameter.

DETAILED DESCRIPTION OF THE EMBODIMENT

Figure 2:
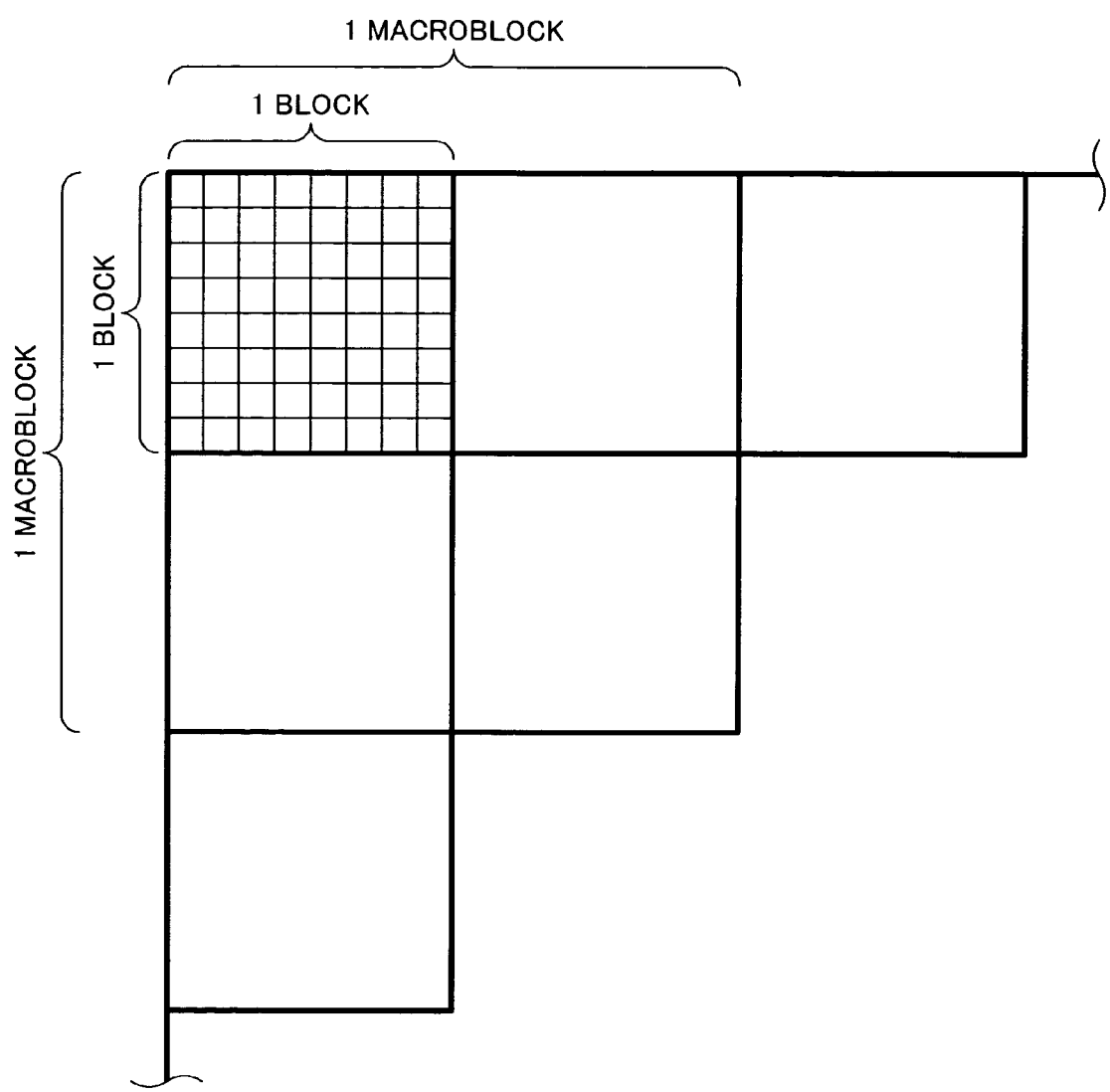
FIG. 2 is illustrative of a macroblock.

This embodiment has been achieved in view of the above-described technical problems, and may provide an image data compression device and an encoder which can optimize allocation of image data compression processing between hardware and software and can securely generate compressed data at a constant rate while preventing deterioration of display quality.

One embodiment of the present invention provides an image data compression device for compressing image data, the image data compression device comprising:

an image data processing section which includes a quantization section which quantizes image data by a quantization step which changes based on a quantization parameter;

a FIFO buffer section in which quantized data for at least N frames (N is an integer larger than one) quantized by the quantization section is buffered;

an encoded data generation section which reads the quantized data from the FIFO buffer section asynchronously from writing into the FIFO buffer section, and generates encoded data by encoding the quantized data;

a rate control section which calculates the quantization parameter by using a data size of the encoded data, and controls a data size of encoded data to be processed by changing the quantization step of the quantization section; and a frame skip section which performs skip processing of causing the image data processing section to skip processing of image data in a frame processed by the image data processing section or image data in a frame subsequent to the processed frame, wherein the rate control section calculates the quantization parameter by using an average data size obtained by averaging the data size of the encoded data for N frames before a frame of the image data quantized by the quantization section, and wherein the frame skip section performs the skip processing when a frame in which the quantization parameter calculated for each frame is greater than a skip threshold continues a number of times equal to or greater than a number of times set as a skip continuous number threshold.

In this embodiment, the FIFO buffer section is provided between the quantization section and the encoded data generation section. This enables the processing of the quantization section and the processing of the encoded data generation section to be performed asynchronously and in parallel. When controlling the generation rate of encoded data by the encoded data generation section, the rate control section changes the quantization step of the quantization section by using the average data size obtained by averaging the data sizes of the encoded data for a plurality of frames before the frame of the image data quantized by the quantization section.

Therefore, since the processing of the quantization section and the processing of the encoded data generation section are performed asynchronously, the generation rate of the encoded data can be controlled even if the rate control method disclosed in MPEG-4 Visual Part (Recommendation ISO/IEC 14496-2: 1999 (E) Annex L) cannot be performed, whereby the encoded data generated by compressing the image data can be generated at a constant rate.

Moreover, the frame skip section is provided and performs the skip processing when a frame in which the quantization parameter is greater than the skip threshold continues a number of times equal to or greater than the number of times set as the skip continuous number threshold. Therefore, when the size of the encoded data is increased depending on the image (image which is not a natural image, in particular) and the bit rate cannot be securely maintained even if the rate control is performed, an increase in the amount of encoded data generated in unit of a frame can be prevented, whereby the bit rate can be maintained.

Another embodiment of the present invention provides an image data compression device for compressing image data, the image data compression device comprising:

an image data processing section which includes a quantization section which quantizes image data by a quantization step which changes based on a quantization parameter;

a FIFO buffer section in which quantized data for at least N frames (N is an integer larger than one) quantized by the quantization section is buffered;

an encoded data generation section which reads the quantized data from the FIFO buffer section asynchronously from writing into the FIFO buffer section, and generates encoded data by encoding the quantized data;

a rate control section which calculates the quantization parameter by using a data size of the encoded data, and controls a data size of encoded data to be processed by changing the quantization step of the quantization section; and a frame skip section which performs skip processing of causing the image data processing section to skip processing of image data in a frame processed by the image data processing section or image data in a frame subsequent to the processed frame, wherein the rate control section calculates the quantization parameter by using an average data size obtained by averaging the data size of the encoded data for N frames before a frame of the image data quantized by the quantization section, and wherein the frame skip section performs the skip processing when complexity corresponding to a difference between image data quantized by the quantization section and image data in a frame before a frame of the quantized image data is equal to or greater than a complexity threshold.

In this embodiment, the FIFO buffer section is provided between the quantization section and the encoded data generation section. This enables the processing of the quantization section and the processing of the encoded data generation section to be performed asynchronously and in parallel. When controlling the generation rate of encoded data by the encoded data generation section, the rate control section changes the quantization step of the quantization section by using the average data size obtained by averaging the data sizes of the encoded data for a plurality of frames before the frame of the image data quantized by the quantization section.

Therefore, since the processing of the quantization section and the processing of the encoded data generation section are performed asynchronously, the generation rate of the encoded data can be controlled even if the rate control method disclosed in MPEG-4 Visual Part (Recommendation ISO/IEC 14496-2: 1999 (E) Annex L) cannot be performed, whereby the encoded data generated by compressing the image data can be generated at a constant rate.

Moreover, the frame skip section is provided and performs the skip processing when the complexity calculated at the time of motion estimation or used when calculating the quantization parameter is equal to the complexity threshold. Therefore, when the size of the encoded data is increased depending on the image (image which is not a natural image, in particular) and the bit rate cannot be securely maintained even if the rate control is performed, an increase in the amount of encoded data generated in unit of a frame can be prevented, whereby the bit rate can be maintained.

With any of these image data compression devices, the rate control section may calculate the quantization parameter by using the average data size obtained by averaging a data size of the encoded data for N frames before the frame of the image data quantized by the quantization section so that the quantization parameter becomes equal to or less than an upper threshold of the quantization parameter.

Since the quantization parameter is calculated so that the quantization parameter becomes equal to or less than the upper threshold of the quantization parameter, the size of the encoded data can be reduced by reducing the size of the quantized data to such an extent that the image quality does not deteriorate. Moreover, since the skip processing can be performed as described above, a constant bit rate can be maintained.

With any of these image data compression devices, when the quantized data read from the FIFO buffer section is data of an intra-frame-coded macroblock which is encoded within one frame, the rate control section may calculate the data size of the encoded data obtained by encoding the quantized data as the average data size.

Since the processing of the quantization section and the processing of the encoded data generation section are performed asynchronously, the generation rate of the encoded data can be suitably controlled when there is no continuity with the image data in the previous frame such as an I picture (Intra-coded picture), even if the rate control method disclosed in MPEG-4 Visual Part (Recommendation ISO/IEC 14496-2: 1999 (E) Annex L) cannot be performed, whereby encoded data generated by compressing image data can be generated at a constant rate.

With any of these image data compression devices, the rate control section may calculate the quantization parameter by using the average data size so that the quantization parameter becomes equal to or less than the upper threshold and becomes equal to or greater than a lower threshold of quantization parameter.

The rate control section calculates the quantization parameter so that the quantization parameter becomes equal to or less than the upper threshold of the quantization parameter. Generally, the size of the quantized data is reduced as the value of the quantization parameter is increased since the image data is thinned out to a greater extent, whereby the size of the encoded data can be reduced. However, block noise significantly occurs in the image generated by decoding the encoded data. Therefore, according to this embodiment, a problem in which block noise significantly occurs in the image obtained by decoding the encoded compressed data, even if the rate control is performed as described above, can be prevented.

The rate control section calculates the quantization parameter so that the quantization parameter is equal to or greater than the lower threshold of the quantization parameter. The amount of thinning out of image data is generally decreased as the value of the quantization parameter is decreased, whereby the size of the quantized data is increased. On the other hand, the amount of block noise is decreased in the image generated by decoding the resulting encoded data. Therefore, according to this embodiment, the data size is not unnecessarily increased even if the rate control is performed as described above.

Therefore, rate control which optimizes the compression efficiency and image quality can be easily realized.

With any of these image data compression devices, the rate control section may calculate the average data size after the quantization section has quantized image data for M frames ($M \geq N$, M is an integer) by a predetermined quantization step.

According to this embodiment, unnecessary rate control can be prevented from being performed when the average value of the data size of the encoded data in the previous N frames is not accurate, whereby deterioration of the image quality can be prevented.

Any of these image data compression devices may include a quantization table which stores a quantization step value, and the rate control section may change the quantization step by performing quantization by using a product of the quantization parameter and the quantization step value.

Any of these image data compression devices may include a discrete cosine transform section which supplies the image data subjected to a discrete cosine transform to the quantization section in unit of a frame.

Any of these image data compression devices may include:

a hardware processing section which processes image data of a moving image by hardware; and a software processing section which generates encoded data by performing encode processing of quantized data read from the FIFO buffer section by software, the hardware processing section may include the image data processing section and the FIFO buffer section, and the software processing section may include the encoded data generation section, the rate control section, and the frame skip section.

Since most of the quantized moving image data is zero data, the amount of information of data is significantly small in comparison with the data before the quantization in many cases. Moreover, the operation load for encoding is generally small. Therefore, even if the processing, in which the amount of information is small and the operation load is small, is performed by the software processing section, the processing load is small. On the contrary, the amount of information is great and the operation is complicated in most quantization processing. Therefore, the processing load is heavy for software processing. Although the above processing is heavy load processing, the necessity of changing the processing is limited if the processing is standardized. Moreover, since most of the processing is repetition, this is suitable for the hardware processing section. Furthermore, since the amount of data after processed by the hardware processing section is small, the amount of data transmitted from the hardware processing section to the software processing section is small, whereby the transmission load is reduced. Since the FIFO buffer section is provided between the software processing section and the hardware processing section, the software processing and the hardware processing can be performed in parallel. In addition, a reduction of the size of the device and a reduction of power consumption can be realized by using the software and the hardware for their corresponding processings.

With any of these image data compression devices, the hardware processing section may output a difference between input image data in a current frame and previous image data in a frame one frame before the current frame as motion vector information, may perform a discrete cosine transform of the motion vector information and output the transformed motion vector information to the quantization section as the image data, and may generate the previous image data based on inverse-quantized data calculated by inverse-quantizing the quantized data by the quantization step.

With any of these image data compression devices, the software processing section may encode the quantized data read from the FIFO buffer section into a variable length code.

With any of these image data compression devices, the software processing section may perform scan processing of rearranging the quantized data read from the FIFO buffer section, and may encode a result of the scan processing into a variable length code.

With any of these image data compression devices, the software processing section may calculate a DC component and an AC component from the quantized data read from the FIFO buffer section, may perform scan processing of rearranging the DC component and the AC component, and may encode a result of the scan processing into a variable length code.

A further embodiment of the present invention provides an encoder which performs compression processing of image data, the encoder comprising:

an image input interface which performs interface processing for inputting image data;

an image data processing section which includes a quantization section which quantizes the image data by a quantization step which changes based on a quantization parameter;

a FIFO buffer section in which quantized data for at least N frames (N is an integer larger than one) quantized by the quantization section is buffered;

a host interface which performs interface processing with a host which reads quantized data stored in the FIFO buffer section asynchronously from writing into the FIFO buffer section; and a software start flag register for allowing the host to start the compression processing, wherein the host calculates the quantization parameter by using an average data size obtained by averaging a data size of encoded data for N frames before a frame of the image data quantized by the quantization section, and sets the software start flag register on condition that a frame in which the quantization parameter is greater than a skip threshold does not continue a number of times equal to or greater than a number of times set as a skip continuous number threshold, and wherein the image data processing section starts the compression processing when the software start flag register has been set.

A still further embodiment of the present invention provides an encoder which performs compression processing of image data, the encoder comprising:

an image input interface which performs interface processing for inputting image data;

an image data processing section which includes a quantization section which quantizes the image data by a quantization step which changes based on a quantization parameter;

a FIFO buffer section in which quantized data for at least N frames (N is an integer larger than one) quantized by the quantization section is buffered;

a host interface which performs interface processing with a host which reads quantized data stored in the FIFO buffer section asynchronously from writing into the FIFO buffer section; and a software start flag register for allowing the host to start the compression processing, wherein the host calculates the quantization parameter by using an average data size obtained by averaging a data size of encoded data for N frames before a frame of the image data quantized by the quantization section, and sets the software start flag register on condition that difference information between image data quantized by the quantization section and image data in a frame before a frame of the quantized image data is less than a complexity threshold, and wherein the image data processing section starts the compression processing when the software start flag register has been set.

According to this embodiment, encode processing for compressing image data of a moving image from an imaging section can be allocated between the encoder and the host, for example. Therefore, generation of encoded data and quantization can be performed in parallel in the encode processing. Moreover, a reduction of size and power consumption of a device which includes the encoder can be realized by using the software and the hardware for their corresponding processings.

The embodiments of the present invention are described below in detail with reference to the drawings. Note that the embodiments described hereunder do not in any way limit the scope of the invention defined by the claims laid out herein. Note also that not all of the elements of these embodiments should be taken as essential requirements to the means of the present invention.

1. MPEG-4

The MPEG-4 encode processing is briefly described below. The decode processing of decoding compressed data encoded by the encode processing is also described below.

FIGS. 1A and 1B are illustrative of the MPEG-4 encode processing and decode processing, respectively. The details of the processing are described in "JPEG & MPEG: Illustrated Image Compression Technology", Hiroshi Ochi and Hideo Kuroda, Nippon Jitsugyo Publishing Co., Ltd., for example. In the following description, only the processing relating to the present invention is mainly described.

In the encode processing shown in FIG. 1A, a motion estimation (ME) between two successive images (two frames) is performed (step S1). In more detail, the difference between two images is calculated for a single pixel. Since the difference becomes zero in the image region in which no change occurs between two images, the amount of information can be reduced. The zero data in this image region and the difference (positive and negative components) in the image region in which a change occurs between two images make up information after the motion estimation.

A discrete cosine transform (DCT) is performed (step S2). The DCT is performed in units of 8×8 pixel blocks shown in FIG. 2 to calculate DCT coefficients in block units. The DCT coefficients after the discrete cosine transform represent changes in light and shade of the image in one block by average brightness (DC component) and spatial frequency (AC component). FIG. 3 shows an example of the DCT coefficients in one 8×8 pixel block (quotation from FIG. 5-6 on page 116 of the above-mentioned literature). The DCT coefficient at the upper left corner represents the DC component, and the remaining DCT coefficients represent the AC components. The influence on image recognition is small even if the high-frequency components of the AC components are omitted.

The DCT coefficients are quantized (step S3). The quantization is performed in order to reduce the amount of information by dividing each DCT coefficient in one block by a quantization step value at the corresponding position in a quantization table. FIG. 5 shows the DCT coefficients in one block obtained by quantizing the DCT coefficients shown in FIG. 3 using a quantization table shown in FIG. 4 (quotation from FIGS. 5-9 and 5-10 on page 117 of the above-mentioned literature). As shown in FIG. 5, most of the DCT coefficients of the high-frequency components become zero data by dividing the DCT coefficients by the quantization step values and rounding off to the nearest whole number, whereby the amount of information is significantly reduced.

A feed-back route is necessary for the encode processing in order to perform the above-described motion estimation between the current frame and the frame subsequent to the current frame. As shown in FIG. 1A, an inverse quantization (iQ), an inverse DCT, and a motion compensation (MC) are performed in the feed-back route (steps S4 to S6). The details of the operation of the motion compensation are omitted. This processing is performed in units of 16×16 pixel macroblocks shown in FIG. 2.

In this embodiment, the series of processing in the steps S1 to S6 is performed by hardware.

DC/AC (direct current/alternating current components) prediction processing performed in a step S7 shown in FIG. 1A and scan processing performed in a step S8 are processing necessary for increasing the efficiency of encoding into a variable length code (VLC) in a step S9. In the VLC encoding in the step S9, the difference in the DC component between adjacent blocks is encoded, and the order of encoding is determined for the AC components by scanning the AC components in the block from the low-frequency side to the high-frequency side (also called a "zigzag scan").

The VLC encoding in the step S9 is also called entropy encoding and has an encoding principle in which a component with a higher emergence frequency is represented by using a smaller amount of code. The difference between adjacent blocks is encoded for the DC component, and the DCT coefficients are sequentially encoded for the AC components in the scan order from the low-frequency side to the high-frequency side by utilizing the results obtained in the step S7 and the step S8.

The amount of information of image data to be generated changes depending on the complexity of the image and intensity of motion. In order to absorb such a change and to transfer information at a constant transfer rate, it is necessary to control the amount of code to be generated. This is achieved by rate control in a step S10. A buffer memory is generally provided for the rate control. The amount of information stored is monitored so that the buffer memory does not overflow, and the amount of information to be generated is reduced. In more detail, the number of bits which represent the DCT coefficient is reduced by roughening the quantization characteristics in the step S3.

In this embodiment, the series of processing in the steps S7 to S10 is performed by software. Specifically, the series of processing in the steps S7 to S10 is realized by hardware which reads the software.

FIG. 1B shows the decode processing of the image data compressed by the encode processing shown in FIG. 1A. The decode processing is achieved by inversely performing the encode processing shown in FIG. 1A in the reverse order. A "postfilter" shown in FIG. 1B is a filter for eliminating block noise. A "YUV/RGB conversion" shown in FIG. 1B means converting the output from the postfilter into an RGB format from a YUV format.

2. Rate Control

The method described in MPEG-4 Visual Part (Recommendation ISO/IEC 14496-2: 1999 (E) Annex L) is briefly described below relating to the rate control performed in the step S10 shown in FIG. 1A. This method changes a quantization parameter at the time of encoding. The quantization characteristics are changed by changing the quantization step of the quantization (step S3) shown in FIG. 1A by changing the quantization parameter, thereby controlling the amount of code (data size) to be generated.

In this method, the amount of code R generated when encoding one frame is controlled by setting a quantization parameter Qc in unit of a frame. In this case, the quantization parameter Qc is calculated according to a model equation shown in FIG. 6.

In FIG. 6, R denotes the amount of code generated when encoding one frame, Qc denotes the quantization parameter, Ec denotes frame complexity, and $X_1$ and $X_2$ denote parameters of this model. The average absolute value of encoding target pixels is used as the frame complexity Ec. The frame complexity Ec of an inter-frame-coded macroblock is calculated after the motion estimation as a value obtained by dividing the sum of the absolute values of the differences $x'_{ij}$ between the current frame and the previous frame by an area A. The frame complexity Ec of an intra-frame-coded macroblock is calculated as a value obtained by dividing the sum of the absolute values ($|x_{ij}-\mu|$) of the differences between the current frame and a reference value $\mu$ by the area A. The reference value $\mu$ may be an average value of all the pixels in the macroblock.

In FIG. 6, the amount of code to be generated is modeled by the quadratic equation of the frame complexity and the reciprocal of the quantization parameter as described above.

Figure 7:
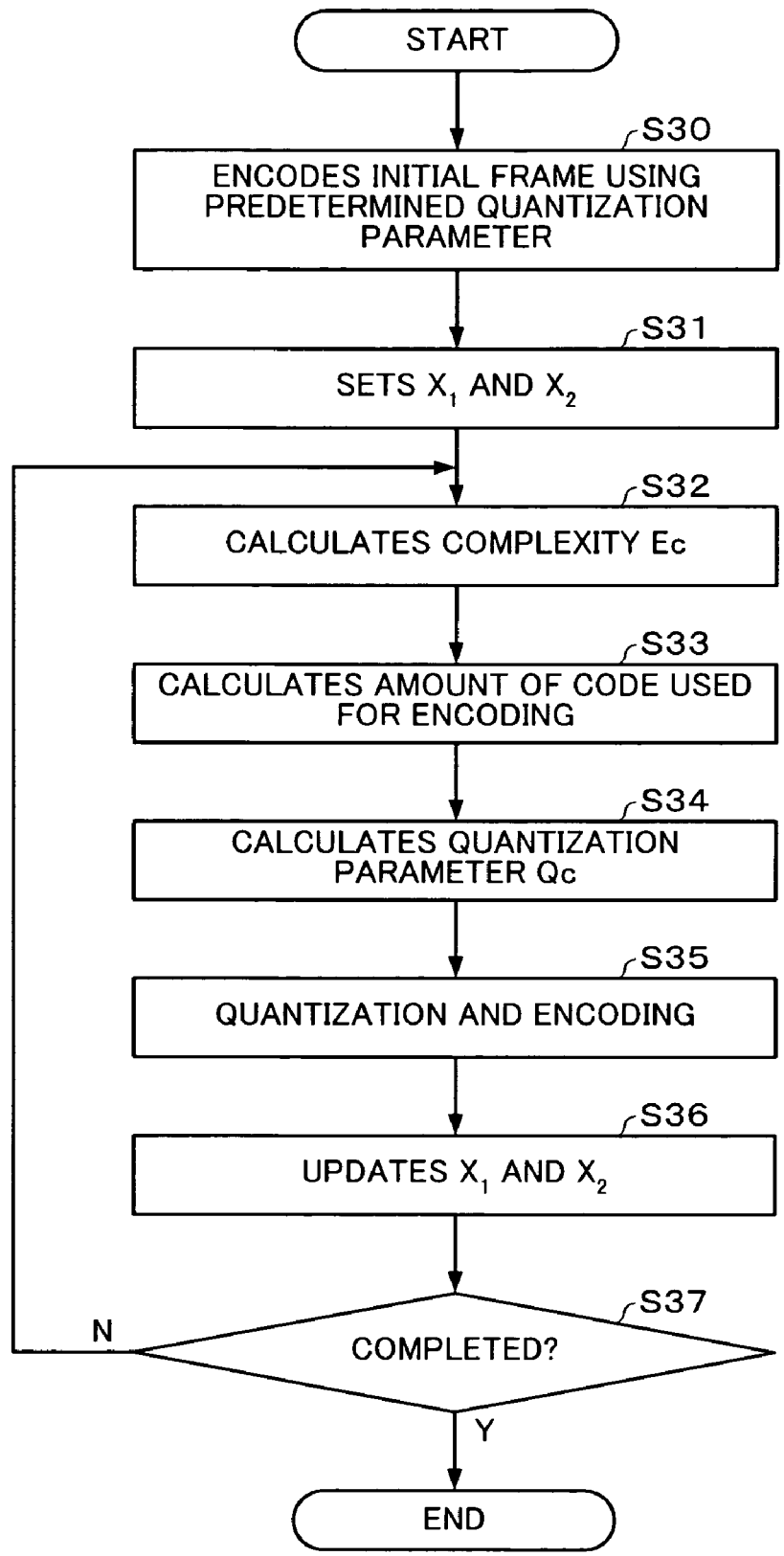
FIG. 7 is a flow chart of an example of rate control processing using the model equation shown in FIG. 6.

FIG. 7 shows an example of a processing flow of the rate control using the model equation shown in FIG. 6.

The initial frame is encoded using a predetermined quantization parameter (step S30). The initial values of the model parameters $X_1$ and $X_2$ are set (step S31). The complexity Ec of the current frame is calculated (step S32). The complexity Ec can be calculated by using the equation shown in FIG. 6. The amount of code used for encoding is calculated based on the available amount of code and the amount of code used in the previous frame (step S33).

The model parameters $X_1$ and $X_2$ set in the step S31 and the complexity Ec calculated in the step S32 are set in the model equation shown in FIG. 6. A value obtained by subtracting the number of bits used in the previous frame excluding information such as the header and the motion vector from the amount of code used for encoding calculated in the step S33 is set in the model equation shown in FIG. 6 as the amount of code R generated when encoding one frame. The quantization parameter Qc is calculated by solving the quadratic equation shown in FIG. 6 in which the parameter is Qc (step S34).

The frame is quantized and encoded using the quantization parameter Qc calculated in the step S34 (step S35), and the model parameters $X_1$ and $X_2$ are calculated from the model equation shown in FIG. 6 based on the quantization parameter and the amount of code generated in the frame encoded one frame before the current frame to update the model parameters $X_1$ and $X_2$ (step S36).

When the processing flow is completed under a predetermined condition (step S37: Y), the series of processing is terminated (END). When the processing is not completed (step S37: N), the step S32 is performed. The above-described processing is performed in each frame.

As described above, in the rate control method described in MPEG-4 Visual Part (Recommendation ISO/IEC 14496-2: 1999 (E) Annex L), it is necessary to cause the encoding result in the previous frame to be reflected in the encoding of the subsequent frame.

3. Image Data Compression Device

This embodiment provides an image data compression device which allocates the series of encode processing between hardware and software, and optimizes the allocation.

Figure 8:
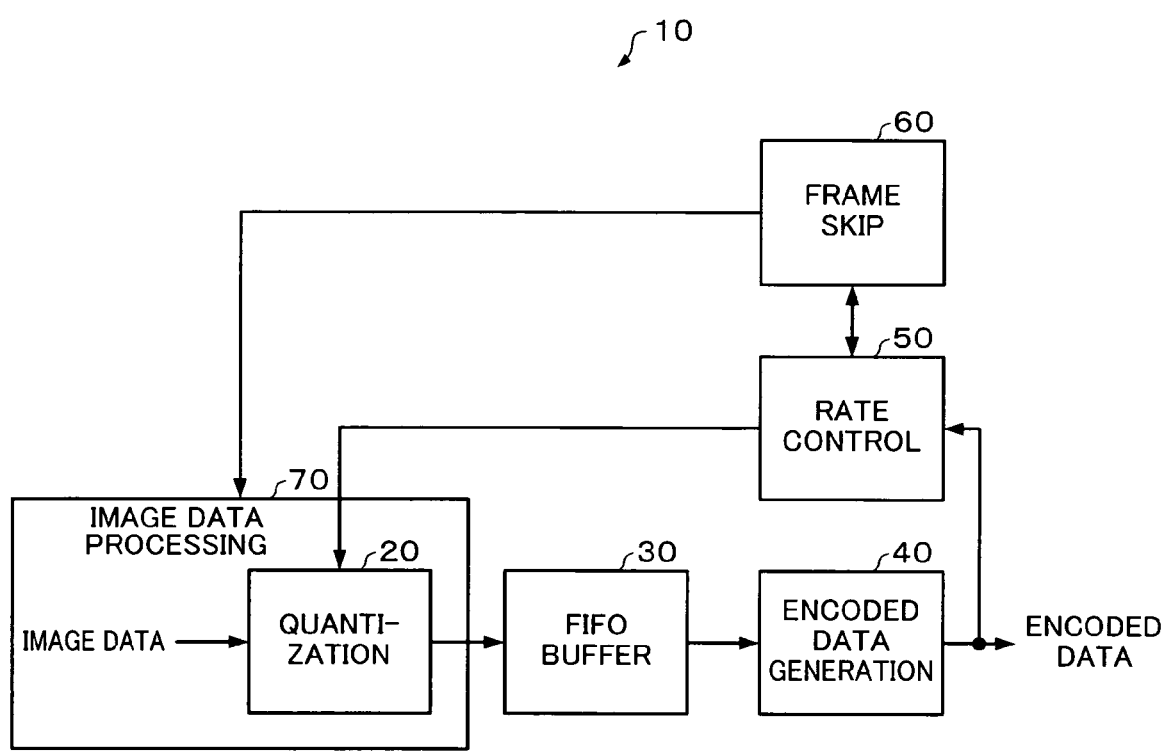
FIG. 8 is a block diagram showing an image data compression device in an embodiment of the present invention.

FIG. 8 is a block diagram of an image data compression device in this embodiment.

An image data compression device 10 in this embodiment includes an image data processing section 70 which includes a quantization section 20. The image data processing section 70 performs processing of compressing image data input in unit of a frame. The quantization section 20 performs the processing in the step S3 shown in FIG. 1A. The quantization section 20 quantizes the image data by the quantization step which changes based on the quantization parameter. The quantization parameter which is set in unit of a frame is set in the quantization section 20. The image data may be represented by the DCT coefficients after the DCT processing in the step S2 shown in FIG. 1A, for example. In this case, the DCT coefficients shown in FIG. 3 are quantized as shown in FIG. 5 by being divided by the product of the quantization step value in the quantization table shown in FIG. 4 and the quantization parameter.

The image data compression device 10 includes a FIFO buffer section 30. The quantized data for at least N frames (N is an integer larger than one) quantized by the quantization section 20 is buffered in the FIFO buffer section 30. The quantized data output from the quantization section 20 in unit of a frame is sequentially written into the FIFO buffer section 30. The FIFO buffer section 30 functions as a first-in first-out storage circuit.

The image data compression device 10 includes an encoded data generation section 40. The encoded data generation section 40 reads the quantized data for one frame from the FIFO buffer section 30, and generates encoded data by encoding the quantized data. The encoded data generation section 40 reads the quantized data for one frame from the FIFO buffer section 30 asynchronously from writing into the FIFO buffer section 30.

The heavy load processing of the quantization section 20 is performed by hardware and the small load encode processing of the encoded data generation section 40 is realized by software processing by providing the FIFO buffer section 30 between the image data processing section 70 which includes the quantization section 20 and the encoded data generation section 40. Moreover, the processing of the quantization section 20 and the processing of the encoded data generation section 40 can be performed in parallel.

The following description is given on the assumption that the quantization section 20 (image data processing section 70) is realized by high-speed hardware and the encoded data generation section 40 is realized by low-speed software processing, for example. However, this embodiment is not limited thereto. This embodiment can be applied to the case where the encoded data generation section 40 reads the quantized data from the FIFO buffer section 30 asynchronously from writing into the FIFO buffer section 30. Therefore, the quantization section 20 (image data processing section 70) may be realized by high-speed hardware, and the encoded data generation section 40 may be realized by low-speed hardware processing, for example. The quantization section 20 (image data processing section 70) and the encoded data generation section 40 may be realized by hardware which reads software, and perform processing asynchronously.

The image data compression device 10 includes a rate control section 50. The rate control section 50 controls the data size of the encoded data by changing the quantization step of the quantization section 20 using the data size of the encoded data generated by the encoded data generation section 40. As is clear from FIG. 5, the amount of zero data of the quantized DCT coefficients is increased by increasing the quantization step. The amount of zero data of the quantized DCT coefficients is decreased by decreasing the quantization step. The quantized data of which the amount of zero data is changed in this manner is written into the FIFO buffer section 30. As a result, the size of the encoded data obtained by allowing the encoded data generation section 40 to encode the quantized data read from the FIFO buffer section 30 can be changed corresponding to the quantization parameter.

As described above, in the rate control method described in MPEG-4 Visual Part (Recommendation ISO/IEC 14496-2: 1999 (E) Annex L), it is necessary to cause the encoding result in the previous frame to be reflected in the encoding of the subsequent frame. However, when the quantization of the quantization section 20 and the encoding of the encoded data generation section 40 are allocated between hardware and software, the quantization and the encoding are processed asynchronously. Therefore, the quantized data read from the FIFO buffer section 30 may be the data in a frame two or more frames before the frame of the data quantized by the quantization section 20. Therefore, the rate control method described in MPEG-4 Visual Part (Recommendation ISO/IEC 14496-2: 1999 (E) Annex L) which causes the encoding result in the previous frame to be reflected in the encoding of the subsequent frame cannot be realized.

In this embodiment, the rate control section 50 calculates the average data size by averaging the data sizes of the encoded data for N frames before the frame of the image data quantized by the quantization section 20, and calculates the quantization parameter using the average data size. The quantization step of the quantization section 20 is changed based on the quantization parameter. For example, when the image data quantized by the quantization section 20 is in the L-th frame (L is a positive integer), the rate control section 50 changes the quantization step using the average data size calculated by averaging the data sizes of the encoded data in the (L−P)th frame (L>P, P is a positive integer) to the (L−P−N+1)th frame (L−P>N−1) for N frames before the L-th frame.

The image data compression device 10 includes a frame skip section 60. The frame skip section 60 performs skip processing of causing the image data processing section 70 to skip the processing of the image data in the frame processed by the image data processing section 70 or the image data in the frame subsequent to the processed frame. Specifically, the frame skip section 60 prevents the image data processing section 70 from processing the current frame, thereby terminating generation of the encoded data in the current frame.

In this embodiment, the frame skip section 60 performs the skip processing when the data size of the encoded data is increased due to the rate control of the rate control section 50 and a constant bit rate cannot be maintained.

Therefore, the frame skip section 60 performs the skip processing when a frame in which the quantization parameter calculated in unit of a frame is greater than a skip threshold continues a number of times equal to or greater than the number of times set as a skip continuous number threshold. Or, the frame skip section 60 performs the skip processing when the complexity corresponding to difference information between the image data quantized by the quantization section 20 and the image data in the previous frame becomes equal to or greater than a complexity threshold. This enables the frame skip section 60 to maintain the bit rate by reducing an increase in the amount of encoded data generated in unit of a frame.

The rate control performed by the rate control section 50 is described below.

Figure 9:
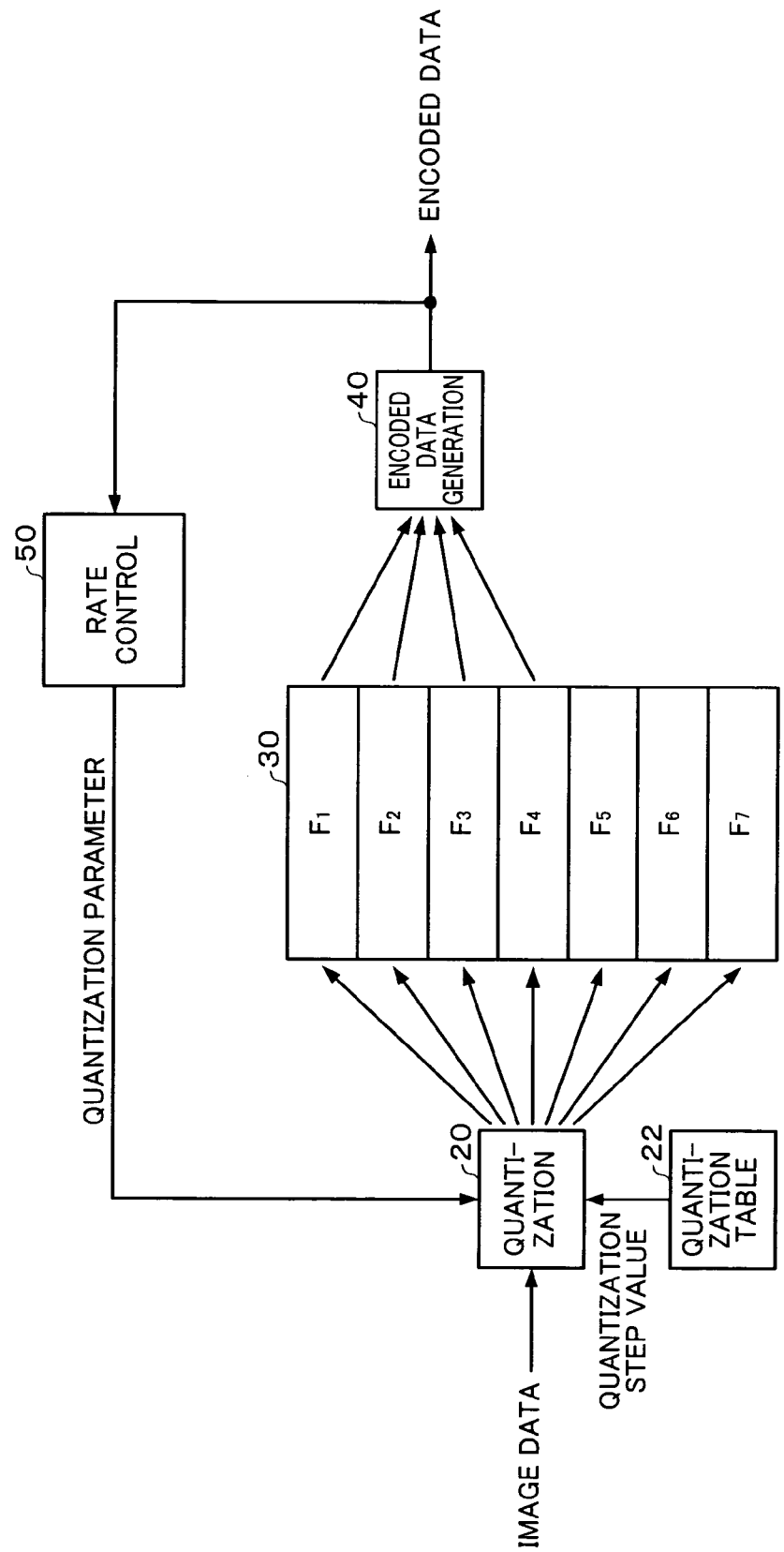
FIG. 9 is illustrative of a rate control method in an embodiment of the present invention.

FIG. 9 is illustrative of the rate control method in this embodiment. In FIG. 9, sections the same as the sections of the image data compression device 10 shown in FIG. 8 are denoted by the same symbols. Description of these sections is appropriately omitted. In FIG. 9, the FIFO buffer section 30 can store quantized data for seven frames.

Figure 10:
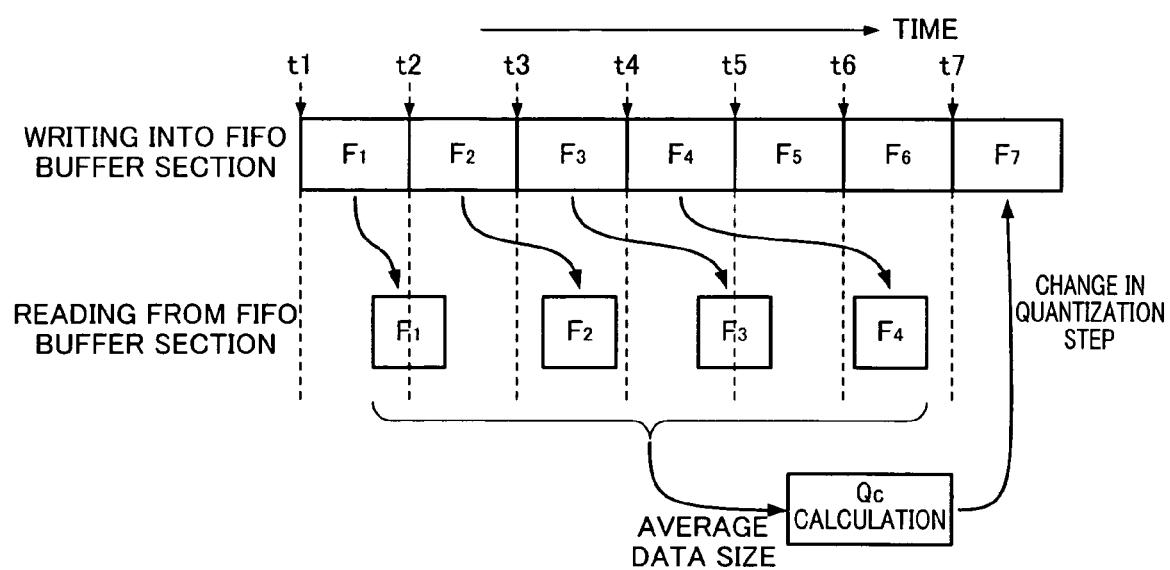
FIG. 10 is a diagram schematically showing operation timing of the rate control method shown in FIG. 9.

FIG. 10 shows a schematic diagram of operation timing of the rate control method shown in FIG. 9.

The quantization section 20 quantizes image data in unit of a frame. For example, a quantization table 22 in which the quantization step values shown in FIG. 4 are set is provided. The quantization section 20 quantizes image data in unit of a frame based on the quantization step values set in the quantization table 22 and the quantization parameter from the rate control section 50. In more detail, the quantization parameter is used as the coefficient of the quantization step values, and the quantization section 20 changes the quantization step by quantizing image data using the product of the quantization parameter and the quantization step values.

The quantization section 20 quantizes image data in unit of a frame at times t1, t2, . . . , and writes the quantized data into the FIFO buffer section 30 in the order of the first frame $F_1$, the second frame $F_2$, . . . . The encoded data generation section 40 reads the quantized data from the FIFO buffer section 30 in unit of a frame asynchronously from the write timing of the quantized data into the FIFO buffer section 30, and performs the encode processing.

The rate control section 50 changes the quantization step of the quantization section 20 using the average data size calculated by averaging the data sizes of the encoded data for four (N=4) frames before the frame of the image data quantized by the quantization section 20 (current frame), for example. This causes the size of the quantized data quantized by the quantization section 20 to be changed, whereby the size of the encoded data generated by the encoded data generation section 40 is also changed.

In FIG. 10, the encoded data generation section 40 sequentially reads the quantized data in the first to fourth frames $F_1$ to $F_4$ from the FIFO buffer section 30, and generates and outputs the encoded data in each frame. In this case, the quantization section 20 quantizes image data in the seventh frame $F_7$.

The rate control section 50 stores the sizes of the encoded data in the first to fourth frames $F_1$ to $F_4$, and calculates the average value of the sizes of the encoded data in the first to fourth frames $F_1$ to $F_4$ as the average data size. As described with reference to FIGS. 6 and 7, the rate control section 50 calculates the amount of code used for encoding of the seventh frame $F_7$ using the average data size, and calculates the quantization parameter Qc. As a result, the quantization section 20 quantizes the image data in the seventh frame $F_7$ using the product of the quantization parameter Qc calculated using the average value of the data sizes of the encoded data in the first to fourth frames $F_1$ to $F_7$ and the quantization step values in the quantization table 22. The quantization result is written into the FIFO buffer section 30. This enables the encoded data to be generated at a desired rate.

In this rate control method, a constant rate must be maintained even when the data size rapidly changes. Therefore, if the value N is decreased, the quantization step follows even when the data size in only one frame rapidly changes, whereby the image quality of other frames deteriorates. On the other hand, if the value N is increased, the quantization step changes to only a small extent when the data size in only one frame rapidly changes.

As an example in which the data size rapidly changes, the case where image data of an intra-frame-coded (I) picture (frame having an intra-frame-coded macroblock which is encoded within one frame) is input can be given. In this case, since there is no continuity with the image data in the previous frame, the generation rate of the encoded data is rapidly decreased, thereby making it necessary to change the rate control method.

In this embodiment, when the quantized data read from the FIFO buffer section 30 is data of an intra-frame-coded macroblock which is encoded within one frame, the rate control section 50 calculates the data size of the encoded data obtained by encoding the quantized data as the average data size. This enables the quantization step to appropriately follow even when there is no continuity with the image data in the previous frame, such as an I picture.

The rate control section 50 may calculate the average data size after the quantization section 20 has quantized the image data for M frames (M≧N, M is an integer) by a predetermined quantization step (quantization step determined in advance), and change the quantization step using the average data size. This prevents unnecessary rate control from being performed when the average value of the data sizes of the encoded data in the subsequent N frames is not accurate, whereby deterioration of the image quality can be prevented.

Even if the rate control is performed as described above, block noise may occur to a large extent in the image obtained by decoding the encoded compressed data depending on the encoding target image. This is because, even if the generation rate of the compressed data is controlled by the rate control method described in MPEG-4 Visual Part (Recommendation ISO/IEC 14496-2: 1999 (E) Annex L), block noise is generally displayed in the image generated by decompressing the compressed data, whereby the display quality may deteriorate.

Figure 11:
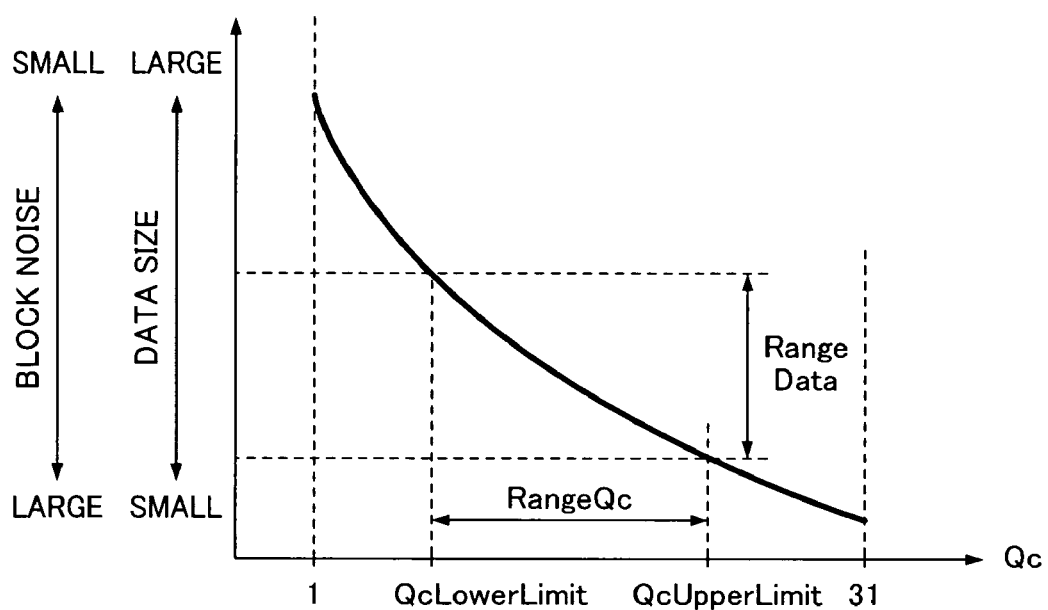
FIG. 11 is a graph showing the relationship among a quantization parameter, data size of encoded data, and block noise.

FIG. 11 schematically shows the relationship among the quantization parameter, the data size of the encoded data, and block noise. In FIG. 11, the horizontal axis indicates the quantization parameter, and the vertical axis indicates the data size and block noise. In the rate control method described in MPEG-4 Visual Part (Recommendation ISO/IEC 14496-2: 1999 (E) Annex L), the range of the value of the quantization parameter Qc is 1 to 31.

As shown in FIG. 11, the image data is thinned out to a greater extent as the value of the quantization parameter is increased, whereby a larger number of DCT coefficients become zero data. This reduces the size of the quantized data, whereby the size of the encoded data can be reduced. However, block noise significantly occurs in the image generated by decoding the resulting encoded data. Specifically, the amount of block noise is increased as the data size is reduced.

Therefore, in this embodiment, an upper threshold of the quantization parameter QcUpperLimit is provided so that the value of the quantization parameter Qc does not exceed a predetermined value. The value of the upper threshold of the quantization parameter QcUpperLimit is set before the rate control. Therefore, the rate control section 50 calculates the quantization parameter by using the average data size calculated by averaging the data sizes of the encoded data for N frames before the frame of the image data quantized by the quantization section 20 so that the quantization parameter becomes equal to or less than the upper threshold of the quantization parameter. A problem in which block noise significantly occurs in the image obtained by decoding the encoded compressed data, even if the rate control is performed as described above, can be prevented by setting the quantization parameter Qc to be equal to or less than the upper threshold of the quantization parameter QcUpperLimit (Qc≦QcUpperLimit).

The amount of thinning out of the image data is decreased as the value of the quantization parameter is decreased, whereby the amount of zero data of the DCT coefficients is decreased. Therefore, the size of the quantized data is increased, whereby the size of the encoded data is also increased. On the other hand, the amount of block noise is decreased in the image generated by decoding the resulting encoded data. Specifically, the amount of block noise is decreased as the data size is increased. For example, when the value of the quantization parameter Qc is one, the image quality of the decoded image can be made maximum. However, the amount of data used as the encoded data for one frame becomes enormous. In this case, noise in an imaging section which cannot be observed by the naked eye remains in its entirety.

Therefore, in this embodiment, a lower threshold of the quantization parameter QcLowerLimit is provided so that the value of the quantization parameter Qc does not become smaller than a predetermined value. The value of the lower threshold of the quantization parameter QcLowerLimit is set before the rate control. Therefore, the rate control section 50 calculates the quantization parameter by using the average data size calculated by averaging the data sizes of the encoded data for N frames before the frame of the image data quantized by the quantization section 20 so that the quantization parameter becomes equal to or less than the lower threshold of the quantization parameter. A problem in which the data size is unnecessarily increased can be prevented, even if the rate control is performed as described above, by setting the quantization parameter Qc to be equal to or greater than the lower threshold of the quantization parameter QcLowerLimit (Qc≧QcLowerLimit).

As described above, the rate control section 50 may calculate the quantization parameter by using the average data size so that the quantization parameter is equal to or less than the upper threshold of the quantization parameter QcUpperLimit or equal to or greater than the lower threshold of the quantization parameter QcLowerLimit. However, the present invention is not limited thereto.

The rate control section 50 may calculate the quantization parameter by using the average data size so that the quantization parameter is equal to or less than the upper threshold of the quantization parameter QcUpperLimit and is equal to or greater than the lower threshold of the quantization parameter QcLowerLimit. In this case, the data size can be set within a range RangeData by setting the value of the quantization parameter Qc within a range RangeQc shown in FIG. 11, whereby rate control which optimizes the compression efficiency and image quality can be easily realized.

The size of the encoded data is increased depending on the image (image which is not a natural image, in particular) when performing the compression processing in each frame, whereby the bit rate may not be securely maintained. In particular, when the upper threshold of the quantization parameter QcUpperLimit of the quantization parameter Qc is provided as described above, while deterioration of the image quality can be prevented, the size of the encoded data in each frame is inevitably increased, whereby the maintenance of the bit rate is likely hindered.

Therefore, this embodiment is effective because the frame skip section 60 performs the skip processing under a predetermined condition as described above. In particular, when the quantization parameter Qc is calculated so as to become equal to or less than the upper threshold of the quantization parameter QcUpperLimit, the frame skip section 60 performs the skip processing when a frame in which the quantization parameter Qc exceeds the skip threshold continues a number of times equal to or greater than the number of times set as the skip continuous number threshold. Therefore, deterioration of the image quality can be prevented, and the bit rate can be securely maintained. Or, when the quantization parameter Qc is calculated so as to become equal to or less than the upper threshold of the quantization parameter QcUpperLimit, the frame skip section 60 performs the skip processing when the complexity corresponding to the difference information between the image data quantized by the quantization section 20 and the image data in the previous frame becomes equal to or greater than the complexity threshold. Therefore, deterioration of the image quality can be prevented, and the bit rate can be securely maintained.

3.1 Calculation Processing of Quantization Parameter Qc

The calculation processing of the quantization parameter Qc performed by the rate control section 50 is described below in detail.

The following description is given on the assumption that the quantization parameter is calculated by using the average data size so that the quantization parameter becomes equal to or less than the upper threshold of the quantization parameter QcUpperLimit and becomes equal to or greater than the lower threshold of the quantization parameter QcLowerLimit.

Figure 12:
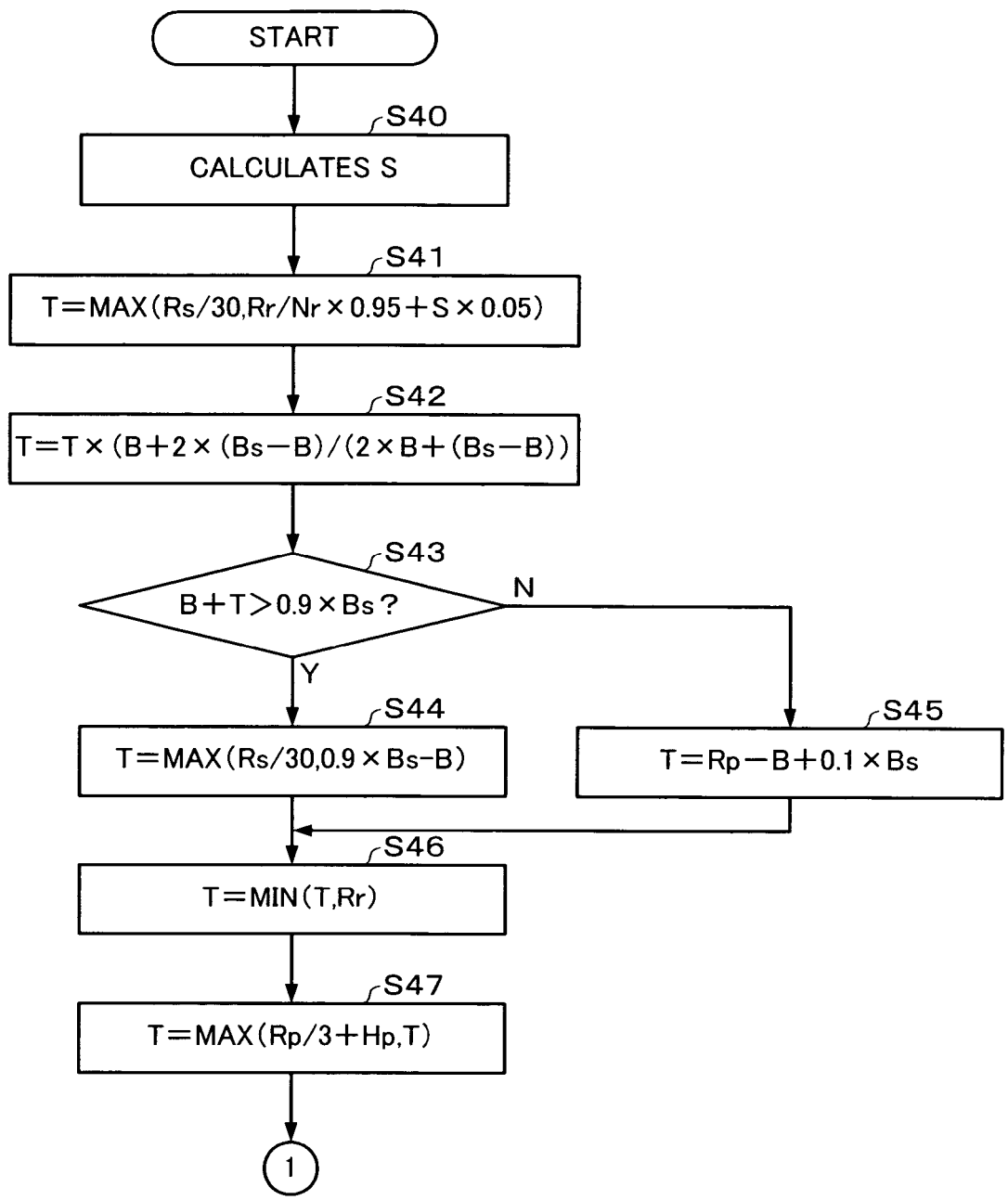
FIG. 12 is a flow chart showing the first half of an example of calculation processing of a quantization parameter.
Figure 13:
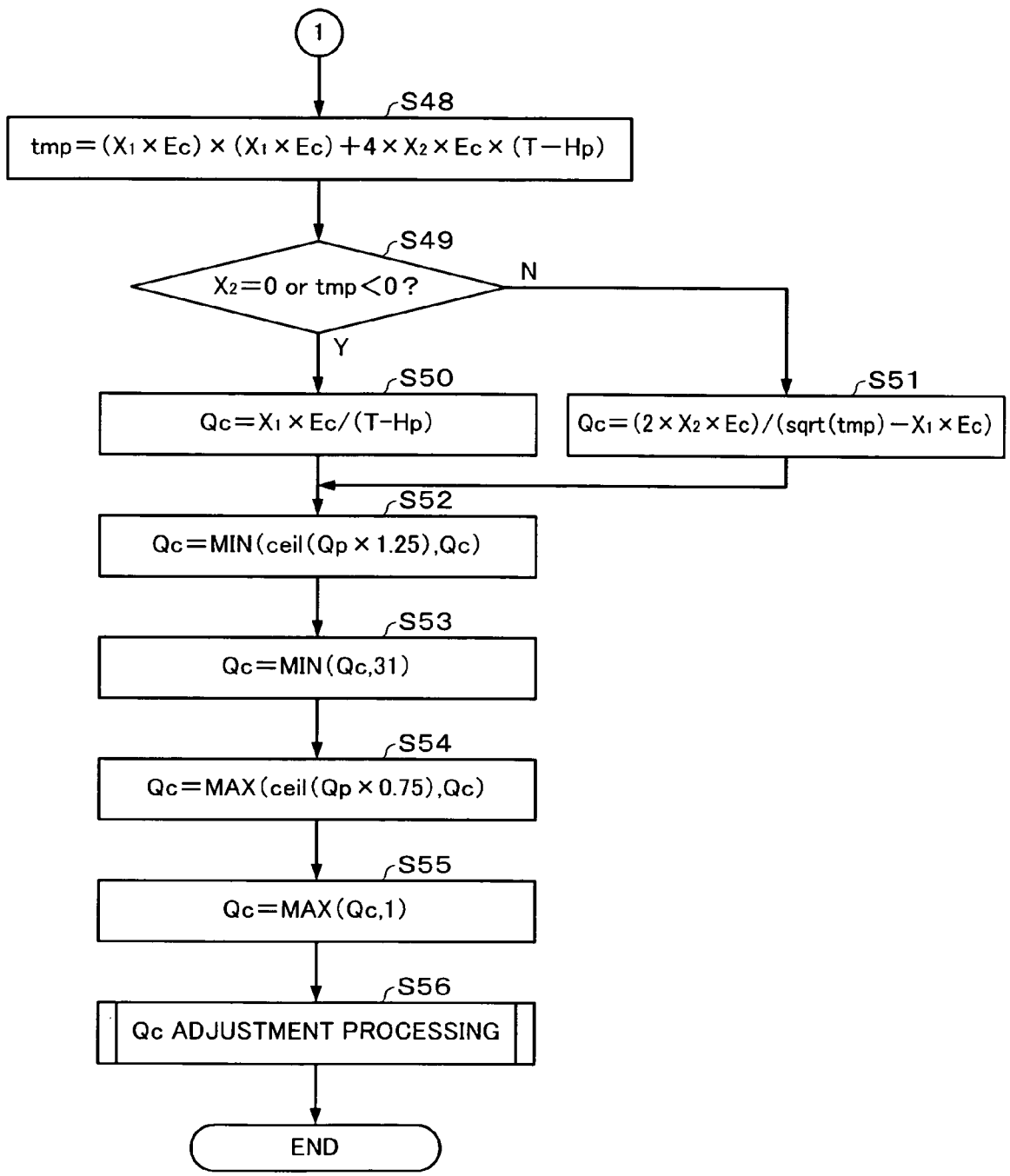
FIG. 13 is a flow chart showing the second half of the calculation processing of a quantization parameter shown in FIG. 12.

FIGS. 12 and 13 show an example of a processing flow of the calculation processing of the quantization parameter Qc. The flow shown in FIGS. 12 and 13 is described below with reference to a table of variables used in the calculation processing of the quantization parameter Qc shown in FIG. 14. The flow shown in FIGS. 12 and 13 is performed in each frame.

The number of bits S used in the previous frame is calculated (step S40). The value of the number of bits Rc used for encoding which has been calculated in the previous frame (number of bits used to encode the current frame) is set as the variable S.

Figure 15:
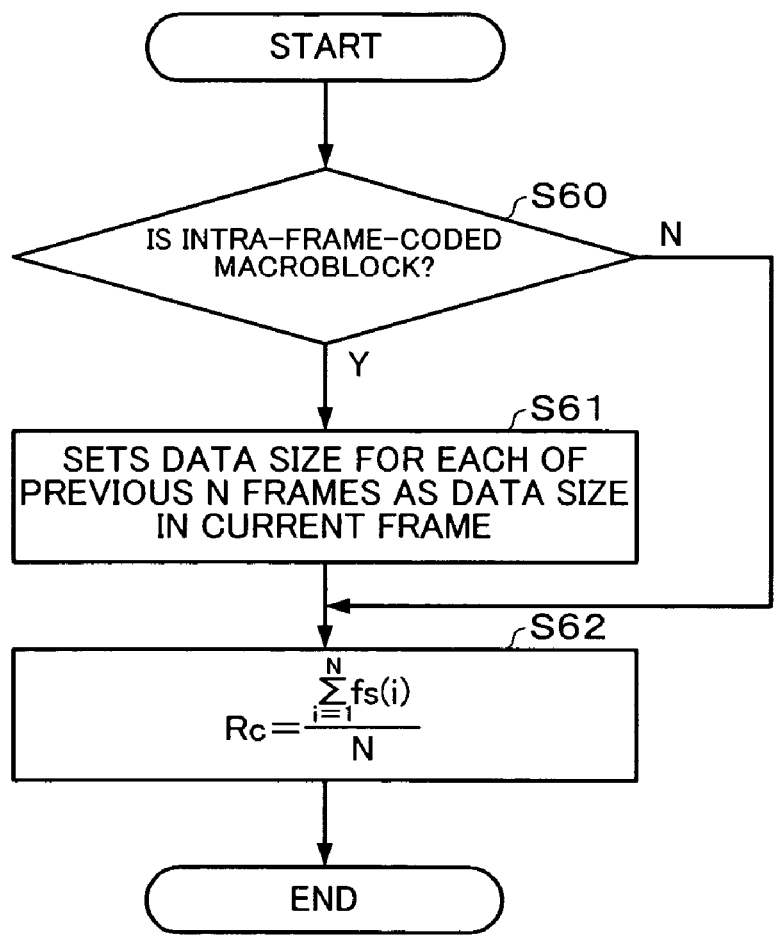
FIG. 15 is a flow chart showing an example of calculation processing of a value of the number of bits used for encoding.

FIG. 15 shows an example of a flow of calculation processing of the value of the number of bits Rc used for encoding. Whether or not the encoding target image data is image data of an intra-frame-coded macroblock is judged (step S60). When the image data is judged to be image data of an intra-frame-coded macroblock (step S60: Y), the data sizes of the encoded data for previous N frames are replaced by the data size of the encoded data in the current frame (step S61).

When it is judged that the encoding target image data is not image data of an intra-frame-coded macroblock, specifically, when it is judged that the encoding target image data is image data of an inter-frame-coded macroblock in the step S60 (step S60: N), or after the step S61 has been performed, the value of the variable Rc is calculated (step S62).

In the step S62, the data size of the encoded data in the previous k-th frame (k is a positive integer) is denoted by fs(k), and the value of the variable Rc is calculated by dividing the sum of the data sizes of the encoded data for the previous N frames by the number of frames N. The value of the variable Rc is the average data size.

Each of the previous N frames is a frame at least two frames before the current frame.

The value of the variable Rc thus calculated is set as the variable S in the next frame.

The description is given by referring back to FIG. 12. When the value of the variable S has been calculated, the number of bits T assigned to the current frame is calculated (step S41). In the step S41, the average number of bits assigned per frame (Rr/Nr) is calculated from the remaining available number of bits Rr and the remaining number of encoding frames Nr, and the number of bits T assigned to the current frame is calculated from the ratio of the resulting value to the number of bits S assigned to the previous frame. In the step S41, the ratio is 0.95:0.05, for example. The number of bits T assigned to the current frame is set so as not to become less than Rs/30 which is the lower limit value.

The number of bits T assigned to the current frame is adjusted from the ratio of the number of currently occupied bits B of the FIFO buffer section 30 to the number of bits Bs of the FIFO buffer section 30 (step S42). As a result, the value of the variable T is increased when the number of currently occupied bits B of the FIFO buffer section 30 is smaller than half of the number of bits Bs of the FIFO buffer section 30, and the value of the variable T is decreased when the number of currently occupied bits B of the FIFO buffer section 30 is greater than half of the number of bits Bs of the FIFO buffer section 30.

Whether or not the sum of the number of currently occupied bits B of the FIFO buffer section 30 and the variable T has exceeded 90 percent of the number of bits Bs of the FIFO buffer section 30 is judged (step S43). When it is judged that the sum has exceeded 90 percent of the variable Bs (step S43: Y), the value of the variable T is set (clipped) at a value obtained by subtracting the value of the variable B from 90 percent of the number of bits Bs of the FIFO buffer section 30 (step S44). Specifically, the sum of the number of currently occupied bits B of the FIFO buffer section 30 and the variable T is set so as not to exceed 90 percent of the number of bits Bs of the FIFO buffer section 30. The value of the variable T is set so as not to become less than the lower limit value Rs/30 in the same manner as in the step S41.

When it is judged that the sum has not exceeded 90 percent of the value of the variable Bs (step S43: N), the value of the variable T is set at a value obtained by subtracting the value of the variable B from the average number of bits Rp generated per frame and adding 10 percent of the variable Bs to the resulting value (step S45). Specifically, the value obtained by subtracting the average number of bits Rp generated per frame from the sum of the variable Bs and the variable T is set so as not to become less than 10 percent of the number of bits Bs of the FIFO buffer section 30.

After the step S44 or S45, the value of the variable T is set so as not to exceed the number of available bits Rr (step S46). The value of the variable T is adjusted so that the value of the variable T does not change to a large extent between frames (step S47).

In order to calculate the quantization parameter Qc, the model equation shown in FIG. 6 is solved as the quadratic equation of the variable Qc. Therefore, the value of the variable tmp is calculated as shown in FIG. 13 (step S48).

When the model parameter $X_2$ is zero, or the value of the variable tmp is a negative value (step S49: Y), the quantization parameter Qc is calculated from the model equation as a linear equation (step S50). Since the variable R becomes a value obtained by subtracting the number of bits Hp used in the previous frame excluding the information such as the header from the number of bits T assigned to the current frame, the quantization parameter Qc is calculated as $Qc=X_1 \times Ec/(T-Hp)$. The value of the variable Ec is the average absolute value of the pixels in the frame as shown in FIG. 6.

When the model parameter $X_2$ is not zero and the value of the variable tmp is equal to or greater than zero (step S49: N), the solution of the quadratic equation derived from the model equation shown in FIG. 6 is used as the quantization parameter Qc (step S51).

After the step S50 or the step S51, the processing is performed so that the difference between the quantization parameter Qc and the quantization parameter Qp in the previous frame is within 25 percent and the quantization parameter Qc is 1 to 31 (step S52, step S53, step S54, and step S55). In the step S52 and the step S54, ceil (x) means that the value x is rounded off to an integer in the positive direction.

In this embodiment, adjustment processing of the value of the quantization parameter Qc calculated in the step S55 is performed (step S56), and the processing is terminated (END).

Figure 16:
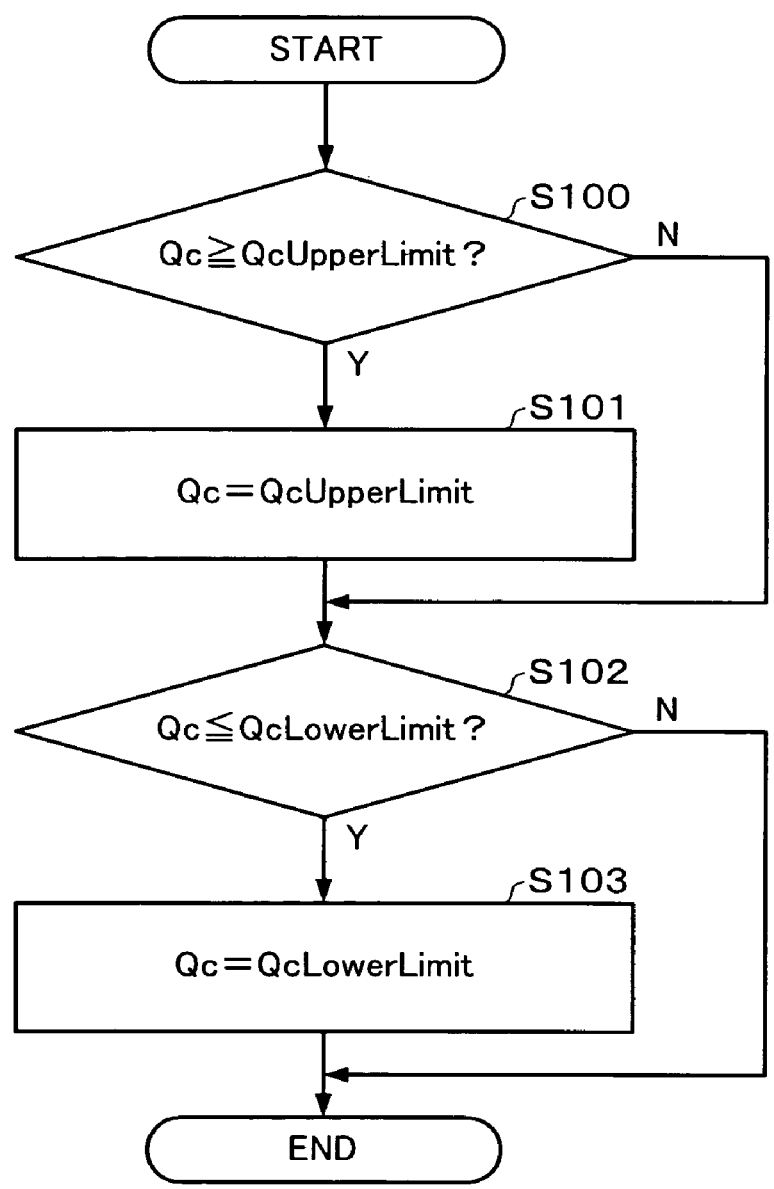
FIG. 16 is a flow chart showing an example of adjustment processing of a quantization parameter.

FIG. 16 shows an example of the adjustment processing of the value of the quantization parameter Qc.

It is judged whether or not the value of the quantization parameter Qc calculated in the step S55 is equal to or greater than the upper threshold of the quantization parameter QcUpperLimit of which the value is set before this adjustment processing (step S100).

When the value of the quantization parameter Qc is judged to be equal to or greater than the upper threshold of the quantization parameter QcUpperLimit (step S100: Y), the value of the quantization parameter Qc is set as the upper threshold of the quantization parameter QcUpperLimit (step S101).

When it is judged that the value of the quantization parameter Qc is not equal to or greater than the upper threshold of the quantization parameter QcUpperLimit (step S100: N), or after the step S101 has been performed, it is judged whether or not the value of the quantization parameter Qc is equal to or less than the lower threshold of the quantization parameter QcLowerLimit of which the value is set before the adjustment processing (step S102).

When the value of the quantization parameter Qc is judged to be equal to or less than the lower threshold of the quantization parameter QcLowerLimit (step S102: Y), the value of the quantization parameter Qc is set as the lower threshold of the quantization parameter QcLowerLimit (step S103).

When it is judged that the value of the quantization parameter Qc is not equal to or less than the lower threshold of the quantization parameter QcLowerLimit (step S102: N), or after the step S103 has been performed, the current value of the quantization parameter Qc is supplied to the quantization section 20 (END in FIG. 16 and END in FIG. 13).

In FIGS. 13 and 16, the adjustment processing is performed in the step S56. However, the present invention is not limited thereto. For example, in FIG. 13, the value 31 in the step S53 may be replaced by the upper threshold of the quantization parameter QcUpperLimit, and the value 1 in the step S55 may be replaced by the lower threshold of the quantization parameter QcLowerLimit without providing the step S56.

The quantization step of the quantization section 20 is changed by supplying the quantization parameter Qc thus calculated to the quantization section 20.

Figure 17:
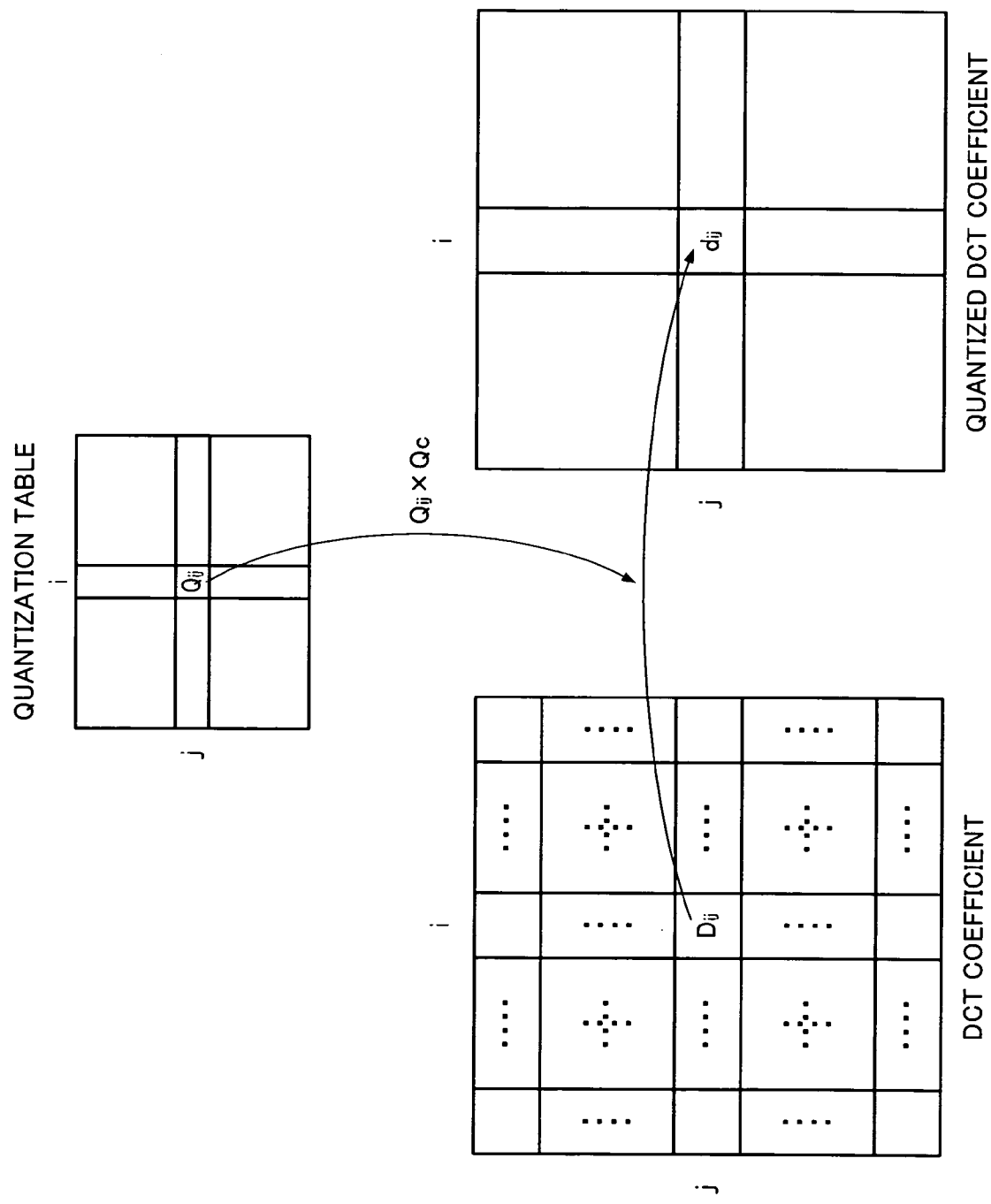
FIG. 17 is illustrative of quantization processing in an embodiment of the present invention.

Specifically, as shown in FIG. 17, a DCT coefficient $D_{ij}$ of image data represented by the DCT coefficients is divided by the product of a quantization step value $Q_{ij}$ at the corresponding position in the quantization table and the quantization parameter Qc to calculate a quantized DCT coefficient $d_{ij}$. As a result, the amount of zero data of the quantized DCT coefficients can be increased or decreased.

3.2 Frame Skip

The skip processing performed by the frame skip section 60 is described below in detail.

Figure 18:
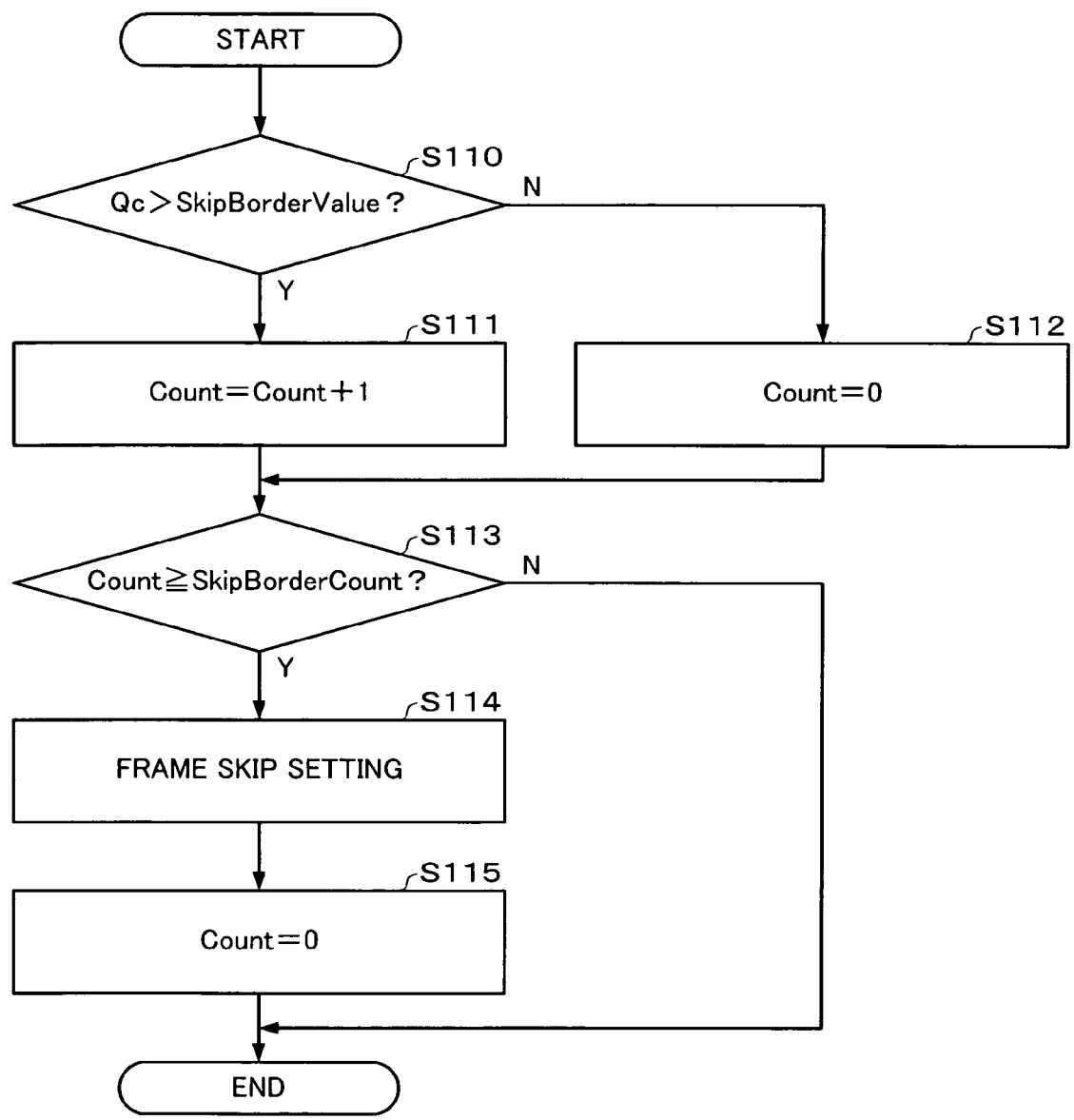
FIG. 18 is a flow chart showing an example of skip processing in an embodiment of the present invention.

FIG. 18 shows a flow diagram of an example of the skip processing performed by the frame skip section 60. FIG. 18 shows a flow when performing the skip processing based on the quantization parameter Qc calculated by the rate control section 50 as described with reference to FIGS. 12 to 16. The flow shown in FIG. 18 is performed in each frame.

Whether or not the value of the quantization parameter Qc calculated by the rate control section 50 is greater than the skip threshold SkipBorderValue is judged (step S110).

When the value of the quantization parameter Qc is judged to be greater than the skip threshold SkipBorderValue (step S110: Y), a counter value Count for counting the skip processing target frame is incremented (step S111). When the value of the quantization parameter Qc is judged to be equal to or less than the skip threshold SkipBorderValue (step S110: N), the counter value Count is set at zero (cleared) (step S112).

After the step S111 or S112, whether or not the counter value Count is equal to or greater than the skip continuous number threshold SkipBorderCount is judged (step S113). When the counter value Count is judged to be equal to or greater than the skip continuous number threshold SkipBorderCount (step S113: Y), the frame skip setting for performing the skip processing is performed (step S114). The counter value Count is then set at zero (step S115), and the processing is terminated (END).

In the frame skip setting in the step S114, the processing of causing the image data processing section 70 to skip the processing of the image data in the frame processed by the image data processing section 70 or the image data in the frame subsequent to the processed frame is performed. The processing of the image data processing section 70 can be masked so as not to be started, the operation clock of the image data processing section 70 can be terminated, or the input of image data can be prevented from being accepted even if the image data processing section 70 is activated by the frame skip setting. The present invention is not limited to the content of the frame skip setting for performing the skip processing. It suffices that the encoded data be not generated.

When the counter value Count is judged to be less than the skip continuous number threshold SkipBorderCount in the step S113 (step S113: N), the processing is terminated (END).

The skip threshold SkipBorderValue and the skip continuous number threshold SkipBorderCount are set before the processing shown in FIG. 18.

As described above, the frame skip section 60 performs the skip processing of skipping the encoding when a frame in which the quantization parameter calculated in unit of a frame is greater than the skip threshold SkipBorderValue continues a number of times equal to or greater than the number of times set as the skip continuous number threshold SkipBorderCount.

Figure 19:
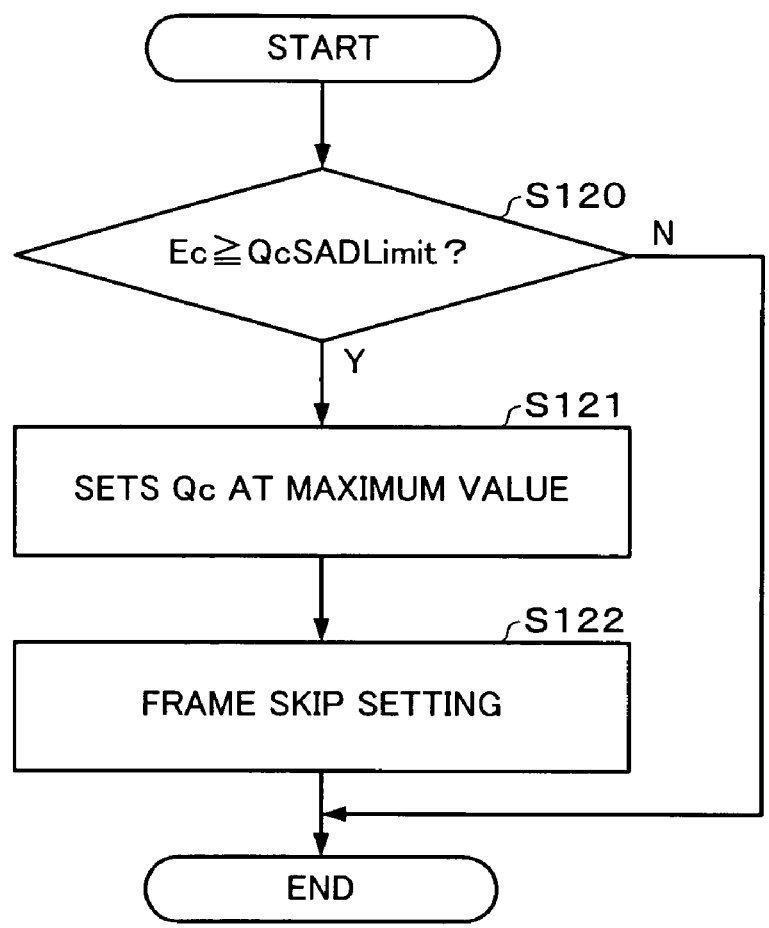
FIG. 19 is a flow chart showing another example of skip processing in this embodiment of the present invention.

FIG. 19 shows a flow diagram of another example of the skip processing performed by the frame skip section 60. FIG. 19 shows a flow when performing the skip processing based on the complexity Ec. The flow shown in FIG. 19 is performed in each frame.

The frame skip section 60 judges whether or not the complexity Ec in the current frame also used to calculate the quantization parameter Qc is equal to or greater than the complexity threshold QcSADLimit (step S120). The current frame may be referred to as the frame of the image data quantized by the quantization section 20. The complexity may be information corresponding to the difference between the image data in the current frame and the image data in the previous frame.

When the complexity Ec is judged to be equal to or greater than the complexity threshold QcSADLimit (step S120: Y), the quantization parameter Qc is set at the maximum value (step S121). The maximum value is either "31" in the step S53 in FIG. 13 or the upper threshold of the quantization parameter QcUpperLimit in the step S101 in FIG. 16. The rate control section 50 performs the rate control using the value of the quantization parameter Qc set in the step S121.

When the quantization parameter Qc is set at the maximum value, the frame skip setting for performing the skip processing is performed (step S122). The frame skip setting is the same as the frame skip setting in the step S114 in FIG. 18.

When the complexity Ec is judged to be less than the complexity threshold QcSADLimit in the step S120 (step S120: N), the processing is terminated (END).

The complexity threshold QcSADLimit is set before the processing shown in FIG. 19.

As described above, the frame skip section 60 performs the skip processing when the complexity Ec is equal to or greater than the complexity threshold QcSADLimit.

The frame skip section 60 is not limited to the frame skip section which performs the processing shown in FIG. 18 or 19. The frame skip section 60 may perform the frame skip setting by combining the processing shown in FIG. 18 and the processing shown in FIG. 19.

Figure 20:
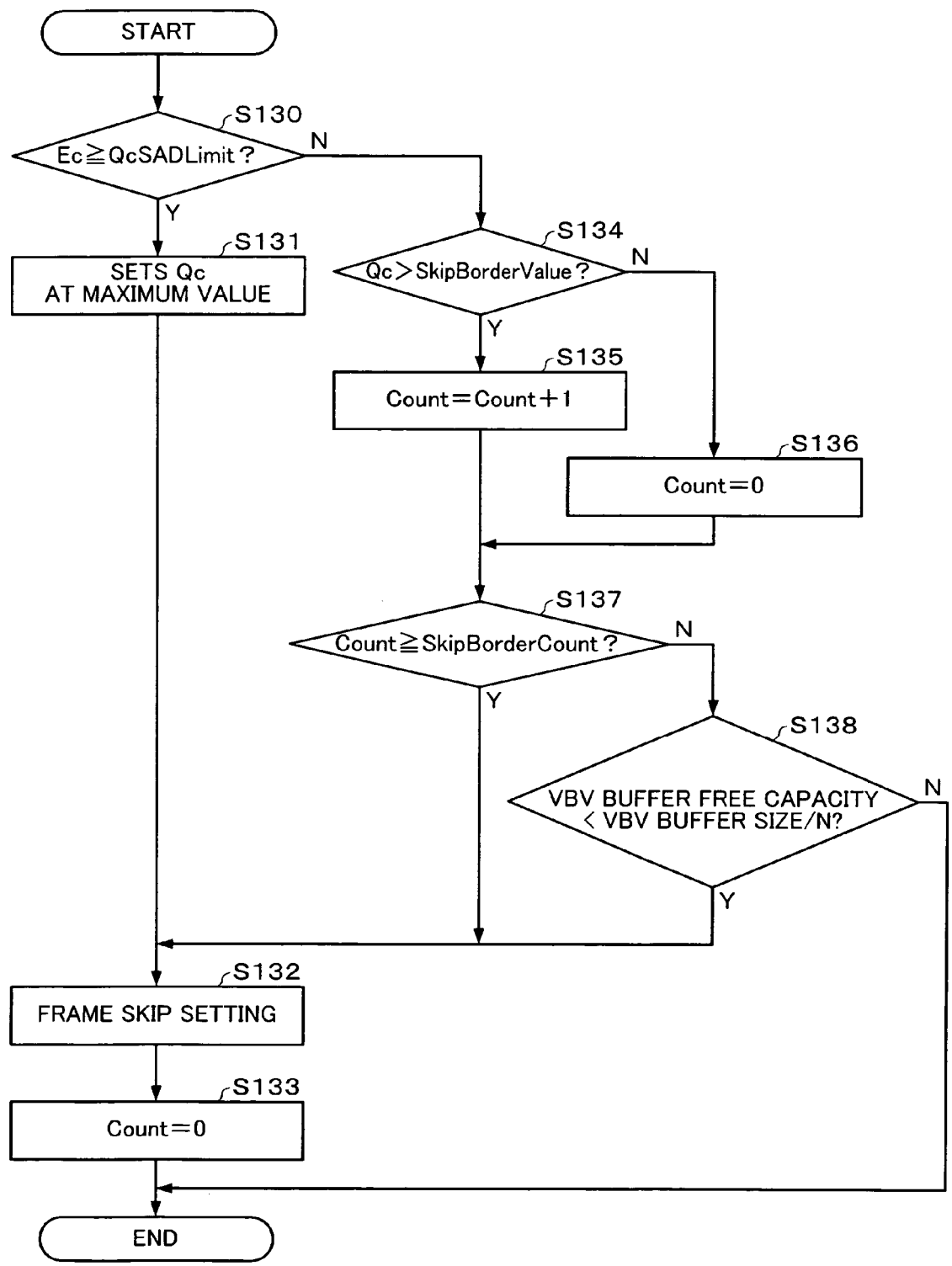
FIG. 20 is a flow chart showing a further example of skip processing in this embodiment of the present invention.

FIG. 20 shows a flow diagram of still another example of the skip processing performed by the frame skip section 60. In this example, after whether or not to perform the skip processing based on the complexity has been judged as shown in FIG. 19, whether or not to perform the skip processing based on the quantization parameter is judged as shown in FIG. 18.

In FIG. 20, the skip processing is performed in order to control the generation rate of the encoded data by providing a virtual buffer verifier called a video buffering verifier (VBV) buffer. The VBV buffer may be referred to as a virtual decoder conceptually connected with the output of the encoded data generation section 40, and the encoded data generation section 40 generates the encoded data so that the VBV buffer does not overflow or underflow.

The frame skip section 60 judges whether or not the complexity Ec is equal to or greater than the complexity threshold QcSADLimit (step S130). When the complexity Ec is judged to be equal to or greater than the complexity threshold QcSADLimit (step S130: Y), the quantization parameter Qc is set at the maximum value (step S131). When the quantization parameter Qc is set at the maximum value, the frame skip setting for performing the skip processing is performed (step S132). The counter value Count for counting the skip processing target frame is then set at zero (step S133), and the processing is terminated (END). The step S131 is the same as the step S121, and the step S132 is the same as the step S114.

When the complexity Ec is judged to be less than the complexity threshold QcSADLimit in the step S130 (step S130: N), whether or not the value of the quantization parameter Qc is greater than the skip threshold SkipBorderValue is judged (step S134). When the value of the quantization parameter Qc is judged to be greater than the skip threshold SkipBorderValue (step S134: Y), the counter value Count is incremented (step S135). When the value of the quantization parameter Qc is judged to be equal to or less than the skip threshold SkipBorderValue (step S134: N), the counter value Count is set at zero (step S136).

After the step S135 or S136, whether or not the counter value Count is equal to or greater than the skip continuous number threshold SkipBorderCount is judged (step S137). When the counter value Count is judged to be equal to or greater than the skip continuous number threshold SkipBorderCount (step S137: Y), the step S132 is performed.

When the counter value Count is judged to be less than the skip continuous number threshold SkipBorderCount in the step S137 (step S137: N), whether or not the value of the free capacity of the VBV buffer is less than the VBV buffer size/N is judged (step S138). When the value of the free capacity of the VBV buffer is judged to be less than the VBV buffer size/N (step S138: Y), the processing proceeds to the step S132, and the skip processing is performed. When the value of the free capacity of the VBV buffer is judged to be equal to or greater than the VBV buffer size/N (step S138: N), the processing is terminated (END).

3.3. Configuration Example

Figure 21:
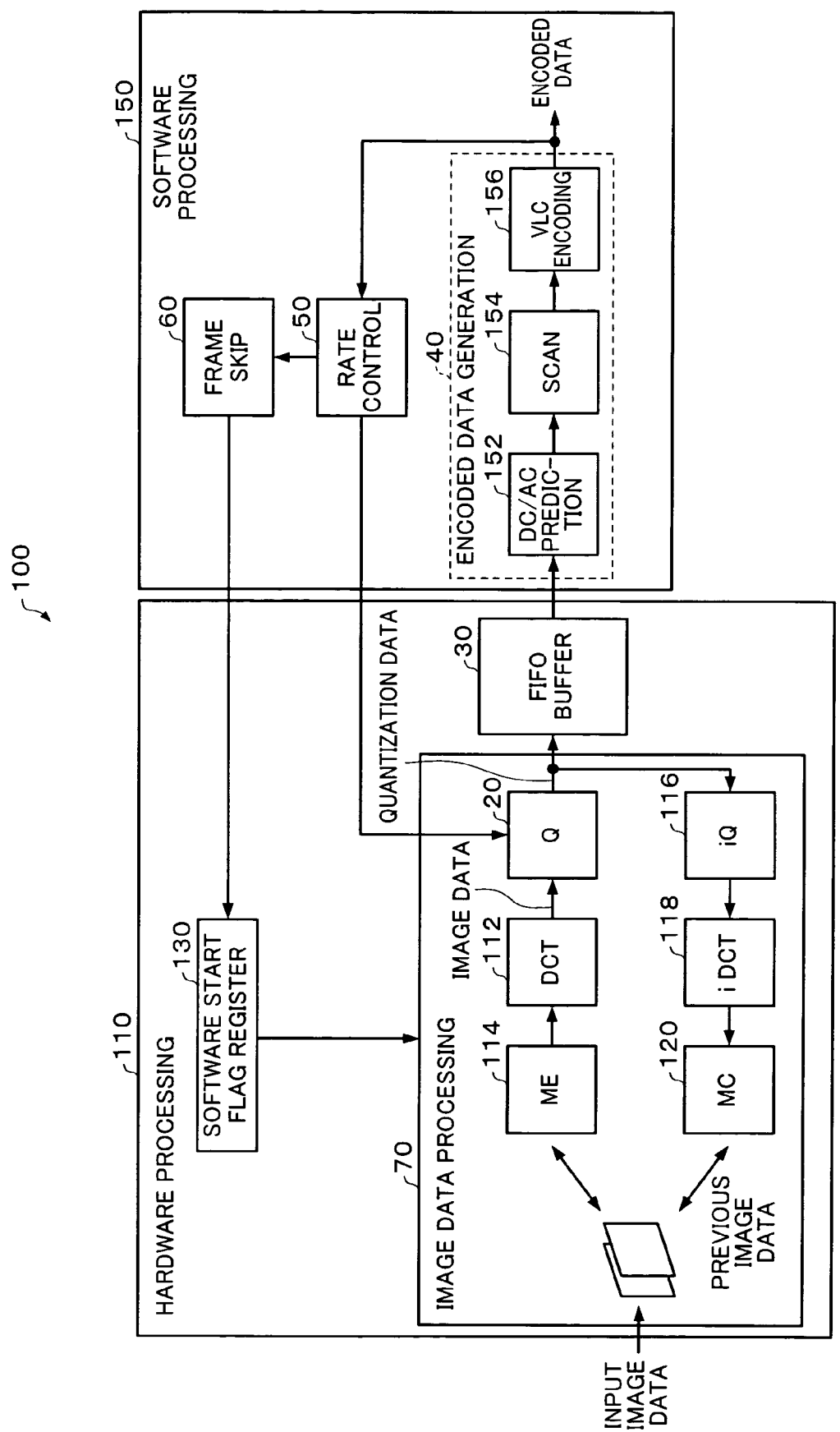
FIG. 21 is a detailed functional block diagram of an image data compression device in an embodiment of the present invention.

FIG. 21 shows a detailed functional block diagram of an image data compression device in this embodiment. In FIG. 21, sections the same as the sections of the image data compression device 10 shown in FIG. 8 are denoted by the same symbols. Description of these sections is appropriately omitted.

An image data compression device 100 shown in FIG. 21 performs compression processing of image data of a moving image conforming to MPEG-4. The image data compression device 100 includes a hardware processing section 110 and a software processing section 150.

The hardware processing section 110 processes image data of a moving image by hardware. The hardware processing section 110 includes the quantization section 20, the image data processing section 70 which includes the FIFO buffer section 30, and a software start flag register 130. The hardware processing section 110 is realized by hardware such as an ASIC and a dedicated circuit without using software.

The software processing section 150 performs encode processing of quantized data read from the FIFO buffer section 30 by software to generate encoded data. The software processing section 150 includes the encoded data generation section 40, the rate control section 50, and the frame skip section 60. The software processing section 150 is a processing section whose function is realized by software (firmware). The function of the software processing section 150 is realized by a CPU (hardware) or the like which reads the software (firmware).

In more detail, the image data processing section 70 of the hardware processing section 110 includes a discrete cosine transform (DCT) section 112, a motion estimation section 114, an inverse quantization section 116, an inverse DCT section 118, and a motion compensation section 120. The DCT section 112 performs the processing in the step S2 shown in FIG. 1A. The motion estimation section 114 performs the processing in the step S1 shown in FIG. 1A. The inverse quantization section 116 performs the processing in the step S4 shown in FIG. 1A. The inverse DCT section 118 performs the processing in the step S5 shown in FIG. 1A. The motion estimation section 120 performs the processing in the step S6 shown in FIG. 1A.

Specifically, the hardware processing section 110 outputs the difference between input image data in the current frame and image data in the previous frame as motion vector information, performs a discrete cosine transform of the motion vector information, and outputs the resulting information to the quantization section. The hardware processing section 110 generates the previous image data based on inverse-quantized data calculated by inverse-quantizing the quantized data by the quantization step.

The processing of the hardware processing section 110 is started when the software start flag register 130 has been set. The software start flag register 130 is set by the software processing section 150. In more detail, the software processing section 150 (frame skip section 60) sets the software start flag register on condition that the frame skip section 60 does not perform the skip processing under the above-described condition.

The hardware processing section 110 does not necessarily include all of these sections. The hardware processing section 110 may have a configuration in which at least one of these sections is omitted.

The encoded data generation section 40 of the software processing section 150 includes a DC/AC prediction section 152, a scan section 154, and a VLC coding section 156. The DC/AC prediction section 152 performs the processing in the step S7 shown in FIG. 1A. The scan section 154 performs the processing in the step S8 shown in FIG. 1A. The VLC coding section 156 performs the processing in the step S9 shown in FIG. 1A.

The software processing section 150 does not necessarily include all of these sections. The software processing section 150 may have a configuration in which at least one of these sections is omitted. For example, the software processing section 150 may encode the quantized data read from the FIFO buffer section 30 into a variable length code. The software processing section 150 may perform scan processing of rearranging the quantized data read from the FIFO buffer section 30, and encode the result of the scan processing into a variable length code. The software processing section 150 may calculate the DC component and the AC components from the quantized data read from the FIFO buffer section 30, perform scan processing of rearranging the DC component and the AC components, and encode the result of the scan processing into a variable length code.

In this embodiment, the steps S1 to S6 shown in FIG. 1A are processed by hardware and the steps S7 to S10 are processed by software for the following reasons. Since zero data accounts for the majority of each block as shown in FIG. 5 after the quantization in the step S3 shown in FIG. 1A, the amount of information on the type of data is significantly small in comparison with the data before the quantization (FIG. 3). Moreover, since the operation load in the steps S7 to S10 is small, the processing load is small even if the processing in the steps S7 to S10 shown in FIG. 1A is processed by software. On the contrary, the quantization in the step S3, DCT in the step S2, and inverse DCT in the step S5 shown in FIG. 1A handle a large amount of information and perform a complicated operation. Therefore, the processing load is heavy for software processing. Although the quantization, DCT, inverse DCT, and motion compensation are heavy load processing, the necessity of changing the processing is limited since the processing is standardized. Moreover, since most of the processing in the steps S1 to S6 shown in FIG. 1A is repetition, this is suitable for hardware processing. Furthermore, since the amount of data after the quantization processed by the hardware processing section 110 is small, the amount of data transferred from the hardware processing section 110 to the software processing section 150 is small, whereby the data transfer control load can be reduced.

Figure 22:
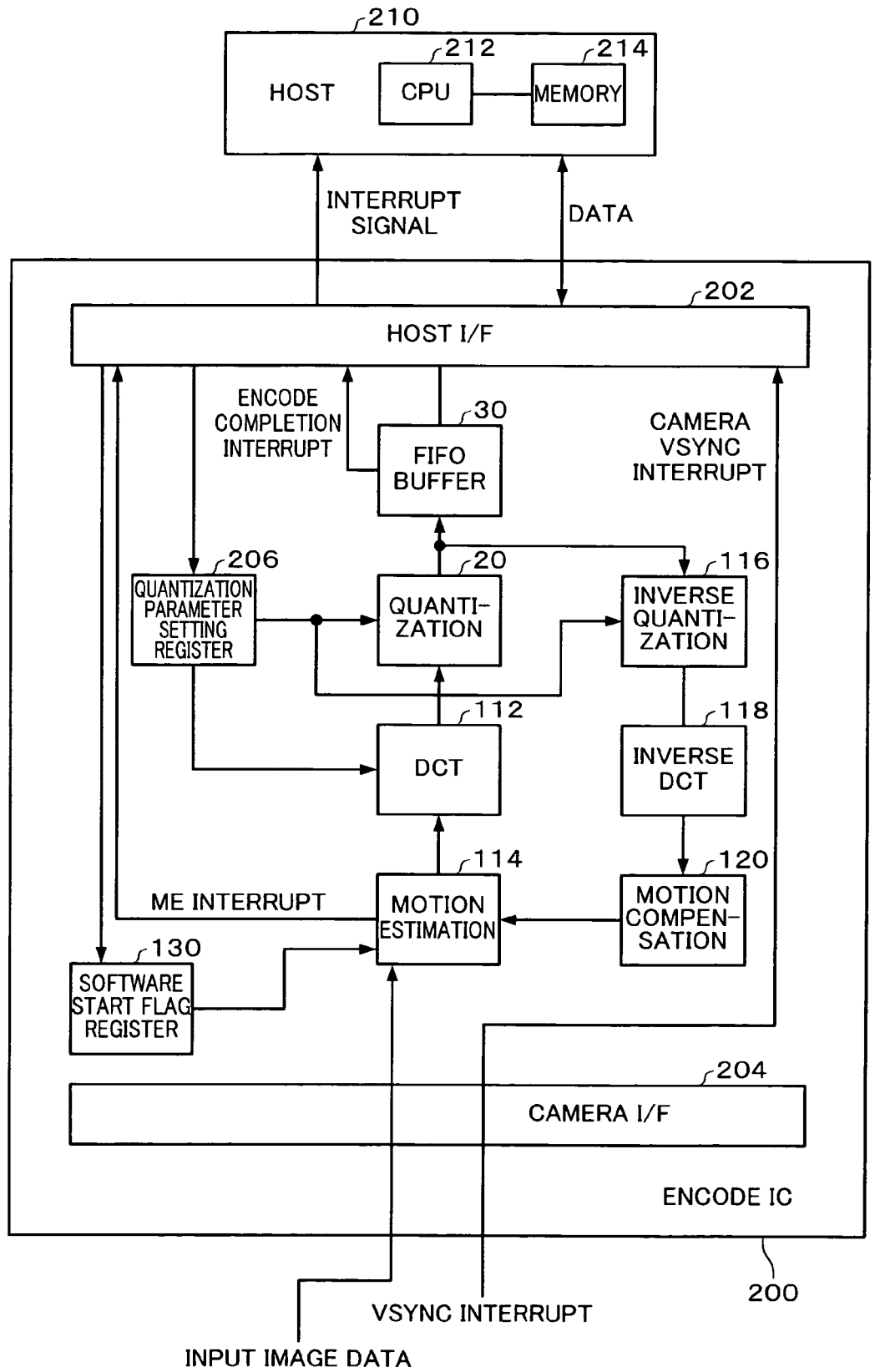
FIG. 22 is a block diagram showing a hardware configuration of the image data compression device shown in FIG. 21.

FIG. 22 shows a hardware configuration example of the image data compression device 100. In this example, the hardware processing section 110 shown in FIG. 21 is integrated and mounted on a semiconductor device as an encoder IC (integrated circuit) (encoder in a broad sense) 200. The function of the software processing section 150 shown in FIG. 21 is realized by a host 210. In FIG. 22, sections the same as the sections of the hardware processing section 110 shown in FIG. 21 are denoted by the same symbols. Description of these sections is appropriately omitted.

The host 210 includes a CPU 212 and a memory 214. A program for realizing the functions of the encoded data generation section 40, the rate control section 50, and the frame skip section 60 is stored in the memory 214. The CPU 212 realizes the functions of the encoded data generation section 40, the rate control section 50, and the frame skip section 60 by reading the program stored in the memory 214, and performs processing based on the program.

Specifically, when the host 210 realizes the function of the frame skip section 60, the CPU 212 performs the processing shown in one of FIGS. 18 to 20. The following description is given on the assumption that the host 210 includes a frame skip setting flag (not shown), and the frame skip setting flag is set in the frame skip setting in the step S114, S122, or S132. The host 210 performs the skip processing when the frame skip setting flag has been set. Therefore, when the frame skip setting flag has been set, the host 210 does not set the software start flag register 130 and does not perform the compression processing of the encoder IC 200 in the frame. When the frame skip setting flag is reset, the host 210 sets the software start flag register 130, and performs the compression processing of the encoder IC 200 in the frame.

The encoder IC 200 encodes image data of a moving image obtained by imaging in a camera module (not shown) (imaging section in a broad sense) conforming to the MPEG-4 standard, and generates the encoded data at a constant rate. Therefore, the encoder IC 200 includes, in addition to the circuit which realizes the function of each section of the hardware processing section 110 shown in FIG. 21, a host interface (I/F) 202, a camera I/F (image input interface in a broad sense) 204, and a quantization parameter setting register 206.

The encoder IC 200 and the host 210 realize the function of the image data compression device shown in FIG. 8 or 21 by exchanging an interrupt signal and data.

The host I/F 202 performs interface processing with the host 210. In more detail, the host I/F 202 controls generation of an interrupt signal from the encoder IC 200 to the host 210, and transmission/reception of data between the host 210 and the encoder IC 200. The host I/F 202 is connected with the FIFO buffer section 30.

The camera I/F 204 performs interface processing for inputting image data of a moving image input from the camera module (not shown). The camera I/F 204 is connected with the motion estimation section 114.

The camera module (not shown) supplies image data of a moving image obtained by imaging to the encoder IC 200 as input image data. The camera module also supplies a VSYNC signal (vertical synchronization signal) which designates the end of the frame of the input image data to the encoder IC 200. When the camera I/F 204 receives the VSYNC signal from the camera module as a VSYNC interrupt, the encoder IC 200 notifies the host 210 of the VSYNC interrupt as a camera VSYNC interrupt through the host I/F 202. This enables the host 210 to perform given addition processing before starting the encoding.

Figure 23:
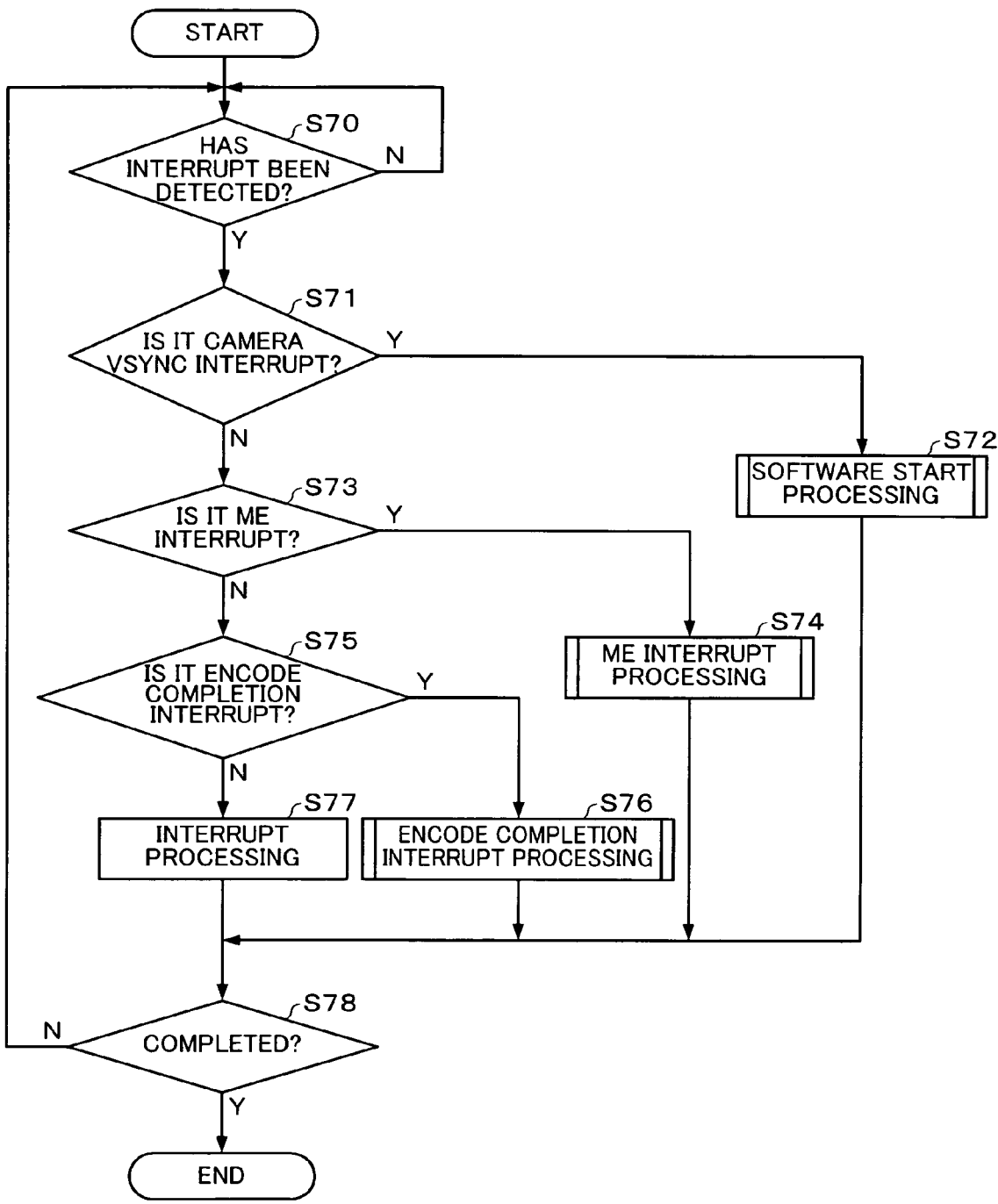
FIG. 23 is a flow chart showing an example of interrupt reception processing performed by a host.

FIG. 23 shows an example of a flow of interrupt reception processing performed by the host 210. A program which realizes the processing shown in FIG. 23 is stored in the memory 214. The CPU 212 reads the program and realizes the processing shown in FIG. 23. The CPU 212 monitors an interrupt input (step S70: N). When the CPU 212 detects an interrupt (step S70: Y), the CPU 124 judges whether or not the interrupt is a camera VSYNC interrupt (step S71).

When the CPU 212 judges that the interrupt is a camera VSYNC interrupt (step S71: Y), software start processing described later is performed (step S72).

When the CPU 212 judges that the interrupt is not a camera VSYNC interrupt in the step S71 (step S71: N), the CPU 124 judges whether or not the interrupt is an ME interrupt described later (step S73).

When the CPU 212 judges that the interrupt is an ME interrupt (step S73: Y), ME interrupt processing described later is performed (step S74).

When the CPU 212 judges that the interrupt is not an ME interrupt in the step S73 (step S73: N), the CPU 212 judges whether or not the interrupt is an encode completion interrupt described later (step S75). When the CPU 212 judges that the interrupt is an encode completion interrupt (step S75: Y), encode completion interrupt processing described later is performed (step S76).

When the CPU 212 judges that the interrupt is not an encode completion interrupt in the step S75 (step S75: N), predetermined interrupt processing is performed (step S77).

After the step S72, S74, S75, or S77, when the processing is not completed (step S78: N), the processing in the step S70 is performed. When the processing is completed (step S78: Y), the processing is terminated (END).

Figure 24:
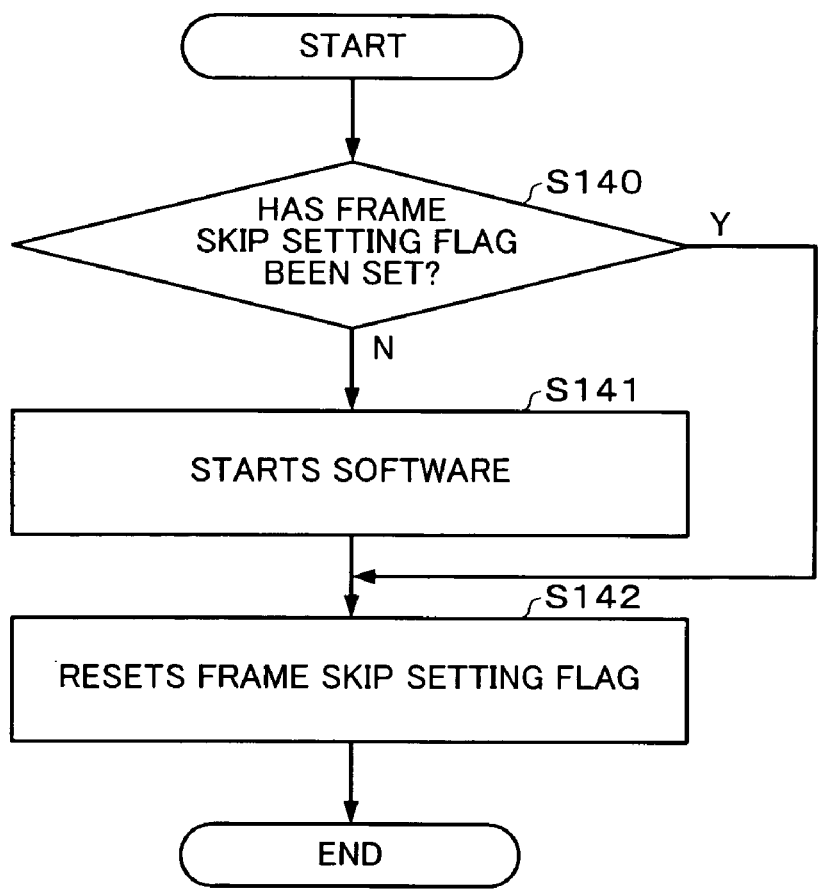
FIG. 24 is a flow chart showing an example of software start processing.

FIG. 24 shows an example of a flow of the software start processing. A program which realizes the processing shown in FIG. 24 is stored in the memory 214. The CPU 212 reads the program and realizes the processing shown in FIG. 24.

The software start processing is performed in the step S72 in FIG. 23.

When a camera VSYNC interrupt is detected, the CPU 212 judges whether or not the frame skip setting flag (not shown) is set (step S140). When it is judged that the frame skip setting flag is not set (is reset) (step S140: N), the CPU 212 starts the software (step S141). Specifically, the CPU 212 sets the software start flag register 130 through the host I/F 202.

The CPU 212 resets the frame skip setting flag after starting the software (step S142), and the processing is terminated (END).

When it is judged that the frame skip setting flag is set in the step S140 (step S140: Y), the step S142 is performed.

The hardware processing section 110 (image data processing section 70) can start the compression processing by performing the software start processing as described above.

The description is given by referring back to FIG. 22. When the software start flag register 130 is set by the host 210 through the host I/F 202, the encoder IC 200 starts encoding.

The motion estimation section 114 does not perform the motion estimation of the input image data captured for the first time after the encoding is started, and performs the motion estimation after the input image data in the next frame has been captured. Since the details of the motion estimation are the same as described above, description of the operations of the inverse quantization section 116 and the like is omitted. The quantized data for at least one frame is written into the FIFO buffer section 30 in the stage in which the motion estimation is performed. After the motion estimation of the motion estimation section 114 has been completed, the motion estimation section 114 notifies the host 210 of a motion estimation completion interrupt (ME interrupt) through the host I/F 202.

Figure 25:
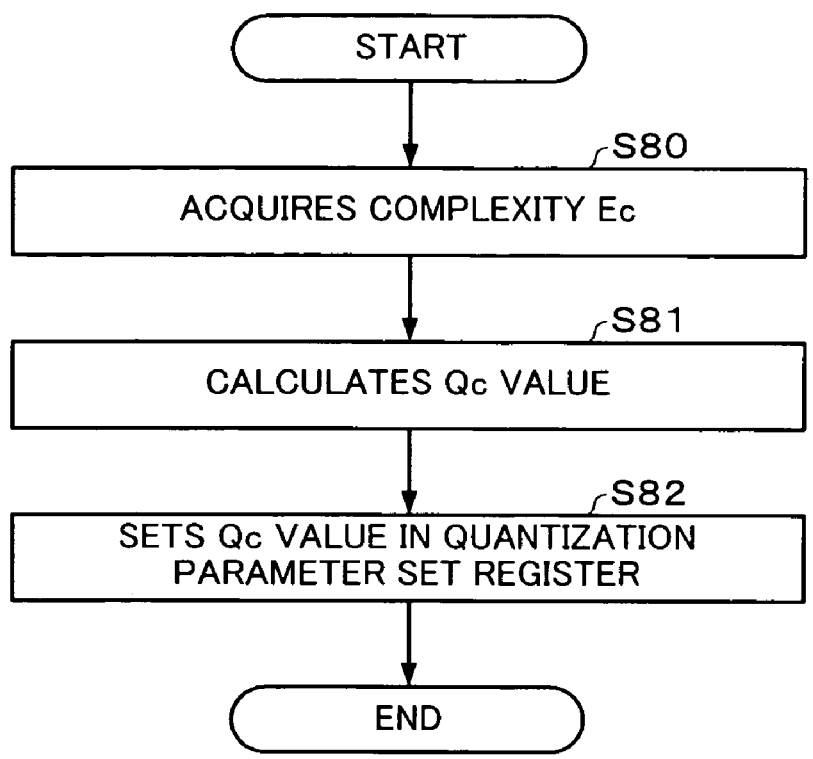
FIG. 25 is a flow chart showing an example of ME interrupt processing.

FIG. 25 shows an example of a flow of the ME interrupt processing. A program which realizes the processing shown in FIG. 25 is stored in the memory 214. The CPU 212 reads the program and realizes the processing shown in FIG. 25.

The ME interrupt processing is performed in the step S74 shown in FIG. 23.

When the ME interrupt is detected, the CPU 212 reads the complexity Ec generated by the motion estimation section 114 through the host I/F 202 (step S80). The complexity Ec is generated by the motion estimation section 114 according to the equation shown in FIG. 6.

The CPU 212 calculates the quantization parameter Qc (step S81). In more detail, the CPU 212 calculates the value of the quantization parameter Qc as described with reference to FIGS. 12 to 16.

The CPU 212 sets the value of the quantization parameter Qc calculated in the step S81 in a quantization parameter setting register 206 through the host I/F 202 (step S82), and the processing is terminated.

The description is given by referring back to FIG. 22. The encoder IC 200 starts processing of the DCT section 112 when the quantization parameter Qc is set in the quantization parameter setting register 206. The quantization section 20 quantizes the DCT coefficients (image data in a broad sense) generated by the DCT section 112 using the quantization parameter set in the quantization parameter setting register 206 and the quantization step values in the quantization table (not shown). The resulting quantized data is written into the FIFO buffer section 30.

When the quantized data is written into the FIFO buffer section 30, the FIFO buffer section 30 notifies the host 210 of the encode completion interrupt which indicates that the encode processing of one frame has been completed through the host I/F 202.

Figure 26:
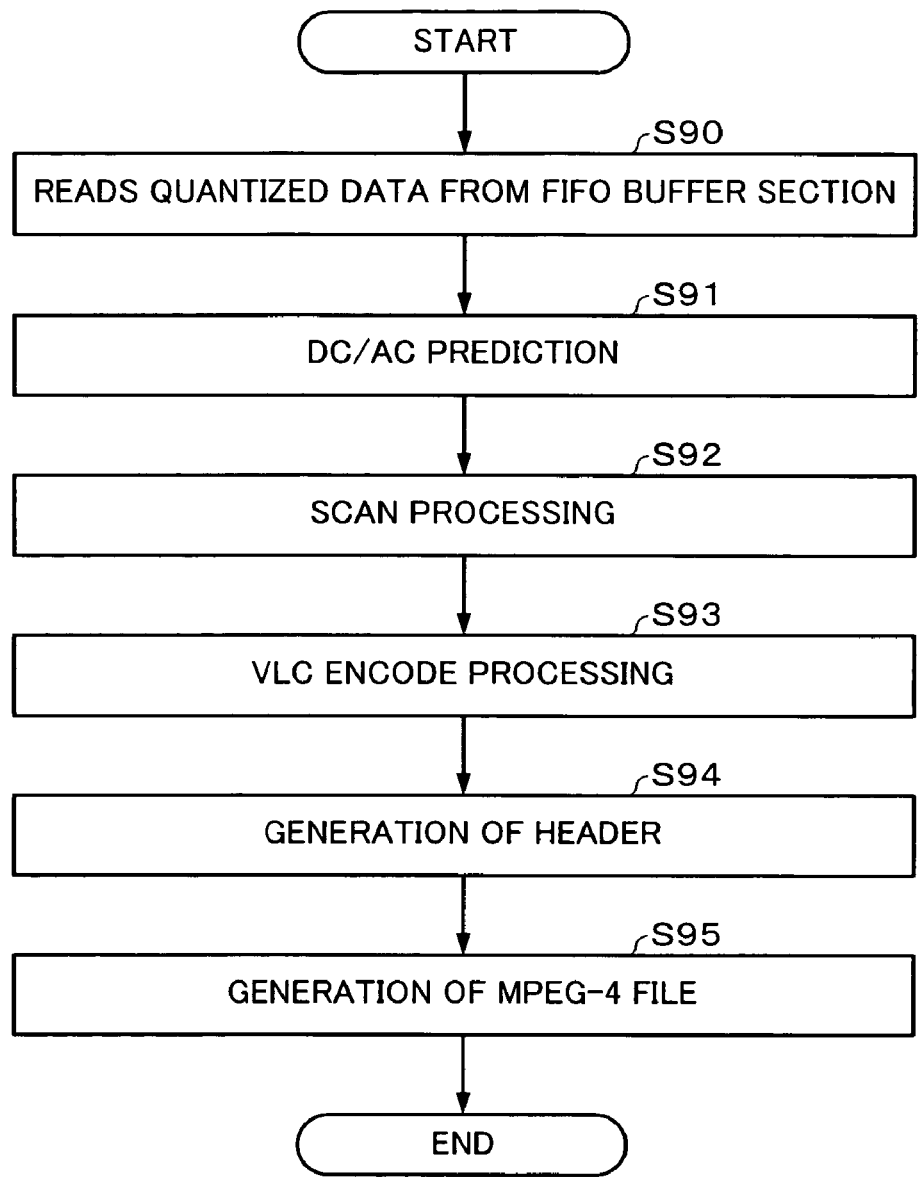
FIG. 26 is a flow chart showing an example of encode completion interrupt processing.

FIG. 26 shows an example of a flow of the encode completion interrupt processing. A program which realizes the processing shown in FIG. 26 is stored in the memory 214. The CPU 212 reads the program and realizes the processing shown in FIG. 26.

The encode completion interrupt processing is performed in the step S76 shown in FIG. 23.

When the CPU 212 detects the encode completion interrupt, the CPU 212 reads the quantized data from the FIFO buffer section 30 in unit of a frame (step S90).

The CPU 212 performs DC/AC prediction processing (step S91), scan processing (step S92), and VLC encoding processing (step S93) in macroblock units to generate encoded data.

The CPU 212 adds a macroblock header to the encoded data generated in the step S93. The resulting encoded data is performed for one video object plane (VOP), a GOV header and a VOP header are generated based on the calculated quantization parameter, and, when the encoding of a predetermined number of frames is completed, the resulting encoded data is output as an MPEG-4 file (step S95).

The compression processing of image data is allocated between and performed by the hardware processing section 110 and the software processing section 150 as described above.

4. Display Controller

The function of the above-described encoder IC may be applied to a display controller.

Figure 27:
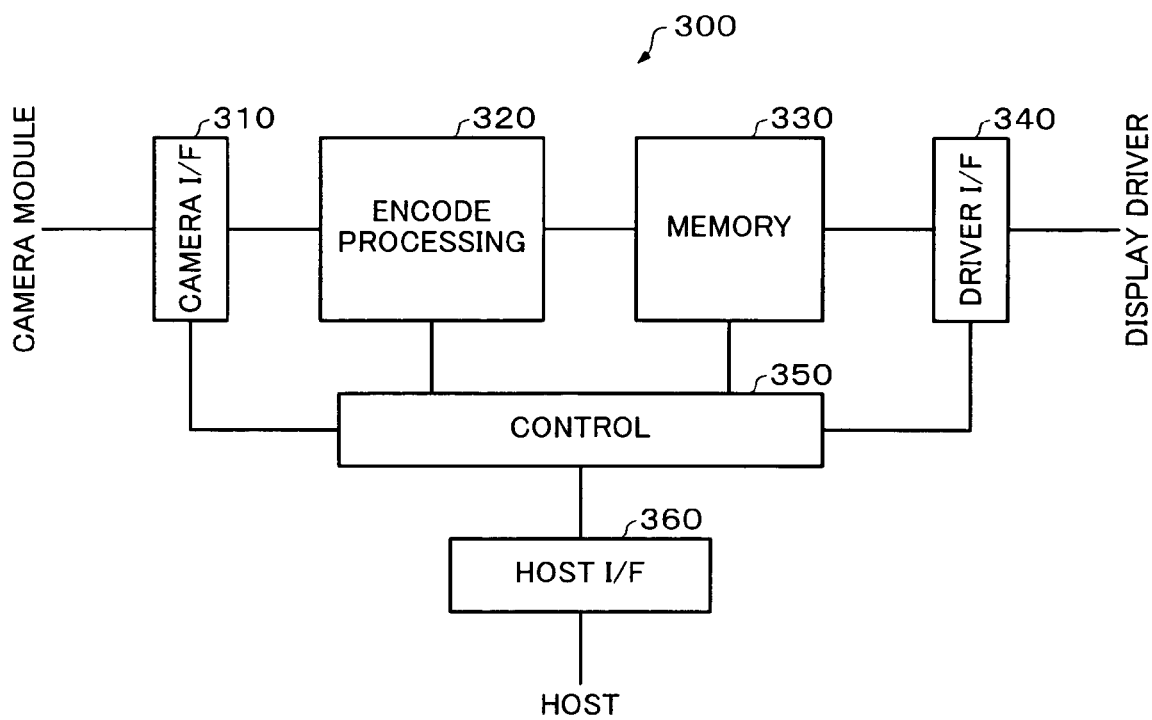
FIG. 27 is a block diagram showing a display controller in an embodiment of the present invention.

FIG. 27 is a block diagram of a display controller in this embodiment.

A display controller 300 includes a camera I/F 310, an encode processing section 320, a memory 330, a driver I/F 340, a control section 350, and a host I/F 360.

The camera I/F 310 is connected with a camera module (not shown). The camera module outputs input image data of a moving image obtained by imaging in a YUV format, and outputs a synchronization signal (VSYNC signal, for example) which designates the end of one frame. The camera I/F 310 performs interface processing for receiving the input image data of the moving image generated by the camera module.

The encode processing section 320 is a section in which the functions of the host I/F 202 and the camera I/F 204 in the encoder IC 200 shown in FIG. 22 are omitted. Specifically, the encode processing section 320 has the function of each of the quantization section 20, the FIFO buffer section 30, the DCT section 112, the motion estimation section 114, the inverse quantization section 116, the inverse DCT section 118, the motion compensation section 120, the quantization parameter setting register 206, and the software start flag register 130 shown in FIG. 22. Specifically, the encode processing section 320 has the function of the image data processing section 70.

The memory 330 stores encoded data which is the output from the encode processing section 320. The memory 330 stores image data to be displayed on a display panel. The driver I/F 340 reads the image data from the memory 330 in a predetermined cycle, and supplies the image data to the display driver which drives the display panel. The driver I/F 340 performs interface processing for transmitting the image data to the display driver.

The control section 350 controls the camera I/F 310, the encode processing section 320, the memory 330, and the driver I/F 340. The control section 350 performs reception processing of the input image data from the camera module, encode processing of the input image, write processing of the encoded data into the memory 330, read processing of the display image data from the memory 330, and transmission processing of the image data to the display driver according to instructions from a host (not shown) through the host I/F 360.

Figure 28:
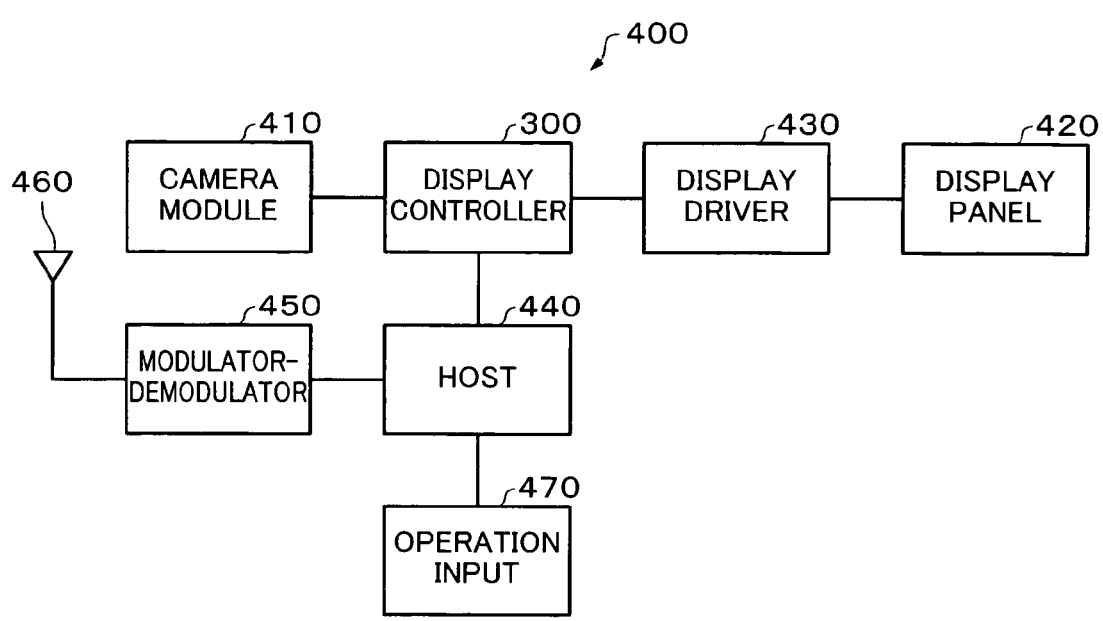
FIG. 28 is a block diagram showing an electronic instrument to which the display controller shown in FIG. 27 is applied.

FIG. 28 shows a block diagram of a configuration example of an electronic instrument to which the display controller shown in FIG. 27 is applied. FIG. 28 shows the block diagram of a configuration example of a portable telephone as an electronic instrument. In FIG. 28, sections the same as the sections shown in FIG. 27 are denoted by the same symbols. Description of these sections is appropriately omitted. A portable telephone 400 includes a camera module 410. The camera module 410 includes a charge-coupled device (CCD) camera, and supplies data of an image imaged by the CCD camera to the display controller 300 in a YUV format.

The portable telephone 400 includes a display panel 420. A liquid crystal display panel may be employed as the display panel 420. In this case, the display panel 420 is driven by a display driver 430. The display panel 420 includes a plurality of scan lines, a plurality of data lines, and a plurality of pixels. The display driver 430 has a function of a scan driver which selects the scan line in units of one or more scan lines, and a function of a data driver which supplies voltage corresponding to image data to the data lines.

The display controller 300 is connected with the display driver 430, and supplies image data to the display driver 430.

A host 440 is connected with the display controller 300. The host 440 controls the display controller 300. The host 440 demodulates image data received through an antenna 460 using a modulator-demodulator section 450, and supplies the demodulated image data to the display controller 300. The display controller 300 causes the display driver 430 to display an image on the display panel 420 based on the image data.

The host 440 has the function of the host 210 shown in FIG. 22. The host 440 encodes the image data generated by the camera module 410 using the encode processing section 320, modulates the encoded data using the modulator-demodulator section 450, and directs transmission of the modulated data to another communication device through the antenna 460. The display controller 300 encodes the image data generated by the camera module 410, and outputs the encoded data to the host 440.

The host 440 performs transmission/reception processing of image data, encode processing, imaging of the camera module 410, and display processing of the display panel based on operation information from an operation input section 470.

FIG. 28 illustrates a liquid crystal display panel as an example as the display panel 420. However, the present invention is not limited thereto. The display panel 420 may be an electroluminescence or plasma display device. The present invention may be applied to a display controller which supplies image data to a display driver which drives these display devices.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An image data compression device for compressing image data, the image data compression device comprising:
   an image data processing section which includes a quantization section which quantizes image data by a quantization step which changes based on a quantization parameter;
   a FIFO buffer section in which quantized data for at least N frames (N is an integer larger than one) quantized by the quantization section is buffered;
   an encoded data generation section which reads the quantized data from the FIFO buffer section asynchronously from writing into the FIFO buffer section, and generates encoded data by encoding the quantized data;
   a rate control section which calculates the quantization parameter by using a data size of the encoded data, and controls a data size of encoded data to be processed by changing the quantization step of the quantization section; and
   a frame skip section which performs skip processing of causing the image data processing section to skip processing of image data in a frame processed by the image data processing section or image data in a frame subsequent to the processed frame,
   wherein the rate control section calculates the quantization parameter by using an average data size obtained by averaging the data size of the encoded data for N frames before a frame of the image data quantized by the quantization section, and
   wherein the frame skip section performs the skip processing when a frame in which the quantization parameter calculated for each frame is greater than a skip threshold continues a number of times equal to or greater than a number of times set as a skip continuous number threshold.

2. The image data compression device as defined in claim 1,
   wherein the rate control section calculates the quantization parameter by using the average data size obtained by averaging a data size of the encoded data for N frames before the frame of the image data quantized by the quantization section so that the quantization parameter becomes equal to or less than an upper threshold of the quantization parameter.

3. The image data compression device as defined in claim 2,
   wherein, when the quantized data read from the FIFO buffer section is data of an intra-frame-coded macroblock which is encoded within one frame, the rate control section calculates the data size of the encoded data obtained by encoding the quantized data as the average data size.

4. The image data compression device as defined in claim 2,
   wherein the rate control section calculates the quantization parameter by using the average data size so that the quantization parameter becomes equal to or less than the upper threshold and becomes equal to or greater than a lower threshold of quantization parameter.

5. The image data compression device as defined in claim 2,
   wherein the rate control section calculates the average data size after the quantization section has quantized image data for M frames (M≧N, M is an integer) by a predetermined quantization step.

6. The image data compression device as defined in claim 1, comprising:
   a quantization table which stores a quantization step value,
   wherein the rate control section changes the quantization step by performing quantization by using a product of the quantization parameter and the quantization step value.

7. The image data compression device as defined in claim 1, comprising a discrete cosine transform section which supplies the image data subjected to a discrete cosine transform to the quantization section in unit of a frame.

8. The image data compression device as defined in claim 1, comprising:
- a hardware processing section which processes image data of a moving image by hardware; and
- a software processing section which generates encoded data by performing encode processing of quantized data read from the FIFO buffer section by software,
- wherein the hardware processing section includes the image data processing section and the FIFO buffer section, and
- wherein the software processing section includes the encoded data generation section, the rate control section, and the frame skip section.

9. The image data compression device as defined in claim 8,
- wherein the hardware processing section outputs a difference between input image data in a current frame and previous image data in a frame one frame before the current frame as motion vector information, performs a discrete cosine transform of the motion vector information and outputs the transformed motion vector information to the quantization section as the image data, and generates the previous image data based on inverse-quantized data calculated by inverse-quantizing the quantized data by the quantization step.

10. The image data compression device as defined in claim 9,
- wherein the software processing section encodes the quantized data read from the FIFO buffer section into a variable length code.

11. The image data compression device as defined in claim, 10
- wherein the software processing section performs scan processing of rearranging the quantized data read from the FIFO buffer section, and encodes a result of the scan processing into a variable length code.

12. The image data compression device as defined in claim 11,
- wherein the software processing section calculates a DC component and an AC component from the quantized data read from the FIFO buffer section, performs scan processing of rearranging the DC component and the AC component, and encodes a result of the scan processing into a variable length code.

13. An image data compression device for compressing image data, the image data compression device comprising:
- an image data processing section which includes a quantization section which quantizes image data by a quantization step which changes based on a quantization parameter;
- a FIFO buffer section in which quantized data for at least N frames (N is an integer larger than one) quantized by the quantization section is buffered;
- an encoded data generation section which reads the quantized data from the FIFO buffer section asynchronously from writing into the FIFO buffer section, and generates encoded data by encoding the quantized data;
- a rate control section which calculates the quantization parameter by using a data size of the encoded data, and controls a data size of encoded data to be processed by changing the quantization step of the quantization section; and
- a frame skip section which performs skip processing of causing the image data processing section to skip processing of image data in a frame processed by the image data processing section or image data in a frame subsequent to the processed frame,
- wherein the rate control section calculates the quantization parameter by using an average data size obtained by averaging the data size of the encoded data for N frames before a frame of the image data quantized by the quantization section, and
- wherein the frame skip section performs the skip processing when complexity corresponding to a difference between image data quantized by the quantization section and image data in a frame before a frame of the quantized image data is equal to or greater than a complexity threshold.

14. The image data compression device as defined in claim 13,
- wherein the rate control section calculates the quantization parameter by using the average data size obtained by averaging a data size of the encoded data for N frames before the frame of the image data quantized by the quantization section so that the quantization parameter becomes equal to or less than an upper threshold of the quantization parameter.

15. The image data compression device as defined in claim 14,
- wherein, when the quantized data read from the FIFO buffer section is data of an intra-frame-coded macroblock which is encoded within one frame, the rate control section calculates the data size of the encoded data obtained by encoding the quantized data as the average data size.

16. The image data compression device as defined in claim 14,
- wherein the rate control section calculates the quantization parameter by using the average data size so that the quantization parameter becomes equal to or less than the upper threshold and becomes equal to or greater than a lower threshold of quantization parameter.

17. The image data compression device as defined in claim 14,
- wherein the rate control section calculates the average data size after the quantization section has quantized image data for M frames (M≧N, M is an integer) by a predetermined quantization step.

18. The image data compression device as defined in claim 13, comprising:
- a quantization table which stores a quantization step value,
- wherein the rate control section changes the quantization step by performing quantization by using a product of the quantization parameter and the quantization step value.

19. The image data compression device as defined in claim 13, comprising a discrete cosine transform section which supplies the image data subjected to a discrete cosine transform to the quantization section in unit of a frame.

20. The image data compression device as defined in claim 13, comprising:
- a hardware processing section which processes image data of a moving image by hardware; and
- a software processing section which generates encoded data by performing encode processing of quantized data read from the FIFO buffer section by software,
- wherein the hardware processing section includes the image data processing section and the FIFO buffer section, and
- wherein the software processing section includes the encoded data generation section, the rate control section, and the frame skip section.

21. The image data compression device as defined in claim 20,
wherein the hardware processing section outputs a difference between input image data in a current frame and previous image data in a frame one frame before the current frame as motion vector information, performs a discrete cosine transform of the motion vector information and outputs the transformed motion vector information to the quantization section as the image data, and generates the previous image data based on inverse-quantized data calculated by inverse-quantizing the quantized data by the quantization step.

22. The image data compression device as defined in claim 21,
wherein the software processing section encodes the quantized data read from the FIFO buffer section into a variable length code.

23. The image data compression device as defined in claim 22,
wherein the software processing section performs scan processing of rearranging the quantized data read from the FIFO buffer section, and encodes a result of the scan processing into a variable length code.

24. The image data compression device as defined in claim 23,
wherein the software processing section calculates a DC component and an AC component from the quantized data read from the FIFO buffer section, performs scan processing of rearranging the DC component and the AC component, and encodes a result of the scan processing into a variable length code.

25. An encoder which performs compression processing of image data, the encoder comprising:
an image input interface which performs interface processing for inputting image data;
an image data processing section which includes a quantization section which quantizes the image data by a quantization step which changes based on a quantization parameter;
a FIFO buffer section in which quantized data for at least N frames (N is an integer larger than one) quantized by the quantization section is buffered;
a host interface which performs interface processing with a host which reads quantized data stored in the FIFO buffer section asynchronously from writing into the FIFO buffer section; and
a software start flag register for allowing the host to start the compression processing,
wherein the host calculates the quantization parameter by using an average data size obtained by averaging a data size of encoded data for N frames before a frame of the image data quantized by the quantization section, and sets the software start flag register on condition that a frame in which the quantization parameter is greater than a skip threshold does not continue a number of times equal to or greater than a number of times set as a skip continuous number threshold, and
wherein the image data processing section starts the compression processing when the software start flag register has been set.

26. An encoder which performs compression processing of image data, the encoder comprising:
an image input interface which performs interface processing for inputting image data;
an image data processing section which includes a quantization section which quantizes the image data by a quantization step which changes based on a quantization parameter;
a FIFO buffer section in which quantized data for at least N frames (N is an integer larger than one) quantized by the quantization section is buffered;
a host interface which performs interface processing with a host which reads quantized data stored in the FIFO buffer section asynchronously from writing into the FIFO buffer section; and
a software start flag register for allowing the host to start the compression processing,
wherein the host calculates the quantization parameter by using an average data size obtained by averaging a data size of encoded data for N frames before a frame of the image data quantized by the quantization section, and sets the software start flag register on condition that difference information between image data quantized by the quantization section and image data in a frame before a frame of the quantized image data is less than a complexity threshold, and
wherein the image data processing section starts the compression processing when the software start flag register has been set.

* * * * *